(12) United States Patent
Valli et al.

(10) Patent No.: US 10,841,537 B2
(45) Date of Patent: Nov. 17, 2020

(54) SPATIALLY FAITHFUL TELEPRESENCE SUPPORTING VARYING GEOMETRIES AND MOVING USERS

(71) Applicant: PCMS Holdings, Inc., Wilmington, DE (US)

(72) Inventors: Seppo T. Valli, Espoo (FI); Pekka K. Siltanen, Helsinki (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/619,045

(22) PCT Filed: May 31, 2018

(86) PCT No.: PCT/US2018/035435
§ 371 (c)(1),
(2) Date: Dec. 3, 2019

(87) PCT Pub. No.: WO2018/226508
PCT Pub. Date: Dec. 13, 2018

(65) Prior Publication Data
US 2020/0099891 A1    Mar. 26, 2020

Related U.S. Application Data
(60) Provisional application No. 62/517,686, filed on Jun. 9, 2017.

(51) Int. Cl.
*H04N 7/15* (2006.01)
*H04N 7/14* (2006.01)

(52) U.S. Cl.
CPC ............. *H04N 7/157* (2013.01); *H04N 7/142* (2013.01); *H04N 7/147* (2013.01); *H04N 7/152* (2013.01)

(58) Field of Classification Search
USPC ........................................... 348/14.09
See application file for complete search history.

(56) References Cited

U.S. PATENT DOCUMENTS 4,400,724 A * 8/1983 Fields ................. H04L 12/1813
                                                            348/14.1
5,495,576 A * 2/1996 Ritchey ................... G06T 17/00
                                                            345/420

(Continued)

FOREIGN PATENT DOCUMENTS

| CN | 106548517 | 3/2017 |
|----|-----------|--------|
| EP | 2953351 A1 | 12/2015 |

(Continued)

OTHER PUBLICATIONS

Schreer, Oliver, et. al., "3DPRESENCE—A System Concept for Multi-User and Multi-Party Immersive 3d Videoconferencing", (2008), 8 pages.

(Continued)

*Primary Examiner* — Maria El-Zoobi
(74) *Attorney, Agent, or Firm* — Invention Mine LLC

(57) ABSTRACT

Systems and methods described herein are provided for managing user positions in a shared virtual geometry, capturing 360° views of a local user environment in a spatially faithful system, and computing a perspective view of a first user from the eye-point of a second user. Users may move around the shared virtual geometry, and perspective views of users may be updated. Some embodiments use a co-centric geometry for group conferencing with other users. Some embodiments may use a grid-based geometry for exploration with other users. Some embodiments may reduce transferred bitrates to enable systems and methods to be implemented in data-limited environments. Some embodiments support users moving and navigating a shared virtual geometry.

20 Claims, 22 Drawing Sheets

(56) References Cited

U.S. PATENT DOCUMENTS

| | | | |
|---|---|---|---|
| 6,577,333 B2 | 6/2003 | Tai | |
| 7,096,428 B2 | 8/2006 | Foote | |
| 7,298,392 B2 | 11/2007 | Cutler | |
| 7,319,980 B2 | 1/2008 | Kronenberger | |
| 7,515,174 B1 | 4/2009 | Francisco | |
| 7,796,155 B1 | 9/2010 | Neely, III | |
| 7,808,540 B2 | 10/2010 | Cok | |
| 7,840,638 B2 | 11/2010 | Zhang | |
| 8,134,556 B2 | 3/2012 | Elsberg | |
| 8,310,519 B2 | 11/2012 | Valenzuela | |
| 8,358,328 B2 | 1/2013 | Friel | |
| 8,471,889 B1 | 6/2013 | Lee | |
| 8,675,067 B2 | 3/2014 | Chou | |
| 8,786,675 B2 | 7/2014 | Deering | |
| 8,872,817 B2 | 10/2014 | Kim | |
| 8,908,008 B2 | 12/2014 | Tan | |
| 8,957,940 B2 | 2/2015 | Tian | |
| 8,976,224 B2 | 3/2015 | Smith | |
| 9,070,216 B2 | 6/2015 | Golparvar-Fard | |
| 9,268,406 B2 | 2/2016 | Geisner | |
| 9,270,941 B1 | 2/2016 | Lavelle | |
| 9,275,499 B2 | 3/2016 | Adhikari | |
| 9,300,916 B1 | 3/2016 | Breedvelt-Schouten | |
| 9,325,939 B2* | 4/2016 | Schultz | G06K 9/00597 |
| 9,332,218 B2 | 5/2016 | Smith | |
| 9,332,222 B2 | 5/2016 | Smith | |
| 9,363,476 B2 | 6/2016 | Fish | |
| 9,836,870 B2 | 12/2017 | Smith | |
| 9,866,699 B2 | 1/2018 | Kleiner | |
| 9,896,206 B2* | 2/2018 | Potter | B64C 3/20 |
| 9,986,206 B2 | 5/2018 | Fish | |
| 10,425,570 B2 | 9/2019 | Van Hoff | |
| 2003/0067536 A1 | 4/2003 | Boulanger | |
| 2003/0234859 A1 | 12/2003 | Malzbender | |
| 2005/0140779 A1 | 6/2005 | Schulz | |
| 2005/0168402 A1 | 8/2005 | Culbertson | |
| 2005/0262201 A1 | 11/2005 | Rudolph | |
| 2006/0104458 A1 | 5/2006 | Kenoyer | |
| 2007/0279484 A1 | 12/2007 | Derocher | |
| 2008/0031608 A1 | 2/2008 | Gorzynski | |
| 2008/0158340 A1 | 7/2008 | Shibata | |
| 2009/0207233 A1 | 8/2009 | Mauchly | |
| 2010/0085416 A1 | 4/2010 | Hegde | |
| 2010/0103244 A1 | 4/2010 | Brandsma | |
| 2010/0115411 A1 | 5/2010 | Sorokin | |
| 2010/0171808 A1 | 7/2010 | Harrell | |
| 2011/0032324 A1 | 2/2011 | George | |
| 2011/0102538 A1 | 5/2011 | Tan | |
| 2012/0033030 A1 | 2/2012 | Liu | |
| 2012/0050458 A1 | 3/2012 | Mauchly | |
| 2012/0154510 A1 | 6/2012 | Huitema | |
| 2012/0176467 A1 | 7/2012 | Kenoyer | |
| 2012/0200658 A1 | 8/2012 | Duckworth | |
| 2012/0281059 A1 | 11/2012 | Chou | |
| 2013/0076853 A1 | 3/2013 | Diao | |
| 2013/0088489 A1 | 4/2013 | Schmeitz | |
| 2013/0141573 A1 | 6/2013 | Sutter | |
| 2013/0198629 A1 | 8/2013 | Tandon | |
| 2013/0249947 A1 | 9/2013 | Reitan | |
| 2013/0258036 A1 | 10/2013 | Tong | |
| 2013/0278631 A1 | 10/2013 | Border | |
| 2013/0300820 A1 | 11/2013 | Liu | |
| 2013/0321564 A1 | 12/2013 | Smith | |
| 2013/0321593 A1 | 12/2013 | Kirk | |
| 2014/0098183 A1 | 4/2014 | Smith | |
| 2014/0104368 A1 | 4/2014 | Tan | |
| 2014/0139610 A1 | 5/2014 | Weber | |
| 2014/0146127 A1 | 5/2014 | He | |
| 2014/0225978 A1 | 8/2014 | Saban | |
| 2014/0232816 A1 | 8/2014 | Wilson | |
| 2014/0240444 A1 | 8/2014 | Szymczyk | |
| 2014/0267584 A1 | 9/2014 | Atzpadin | |
| 2014/0270302 A1 | 9/2014 | Pocino | |
| 2015/0055929 A1 | 2/2015 | Van Hoff | |
| 2015/0078582 A1 | 3/2015 | Graham | |
| 2015/0091891 A1 | 4/2015 | Raheman | |
| 2015/0213650 A1 | 7/2015 | Barzuza | |
| 2015/0215351 A1 | 7/2015 | Barzuza | |
| 2015/0215581 A1 | 7/2015 | Barzuza | |
| 2015/0312294 A1 | 10/2015 | Olsen | |
| 2015/0373303 A1 | 12/2015 | Visosky | |
| 2016/0050391 A1 | 2/2016 | Schultz | |
| 2016/0148433 A1 | 5/2016 | Petrovskaya | |
| 2016/0173823 A1 | 6/2016 | Duckworth | |
| 2016/0353058 A1 | 12/2016 | Caviedes | |
| 2017/0019632 A1 | 1/2017 | Lad | |
| 2017/0127023 A1* | 5/2017 | High | G06T 7/30 |
| 2017/0339372 A1 | 11/2017 | Valli | |
| 2018/0108172 A1 | 4/2018 | Huston | |
| 2019/0253667 A1* | 8/2019 | Valli | H04S 7/303 |

FOREIGN PATENT DOCUMENTS

| | | |
|---|---|---|
| WO | 2008101117 A1 | 8/2008 |
| WO | 2016077180 A1 | 5/2016 |
| WO | 2017030985 A1 | 2/2017 |

OTHER PUBLICATIONS

Buxton, William, "Interfaces for Multiparty Videoconferencing". In K. Finn, A. Sellen & S. Wilber (Eds.). Video Mediated Communication. Hillsdale, N.J.: Erlbaum, (1997), pp. 385-400.

Maimone, Andrew, et. al., "Real-Time Volumetric 3D Capture of Room-Sized Scenes for Telepresence", 3DTV Conference: The True Vision—Capture, Transmission and Display of 3D Video, 3DTV-CON 2012, Zurich, Switzerland, Oct. 15-17, 2012.

Kannala, Juho, et. al, "A Generic Camera Model and Calibration Method for Conventional, Wide-Angle and Fish-Eye Lenses". IEEE Transactions on Pattern Analysis and Machine Intelligence, vol. 28, No. 8, Aug. 2006, 15 pages.

Scaramuzza, Davide, et. al., "Visual Odometry: Part I—The First 30 Years and Fundamentals". IEEE Robotics and Automation Magazine, vol. 18, No. 4, Dec. 2011, 13 pages.

Fraundorfer, Friedrich, et. al. "Visual Odometry: Part II—Matching, Robustness, and Applications". IEEE Robotics and Automation Magazine, vol. 19, No. 2, Jun. 2012, 13 pages.

Xu, Yang, et. al., "Video Telephony for End-consumers: Measurement Study of Google+, iChat, and Skype". In Proceedings of the 2012 ACM conference on Internet measurement conference, Nov. 2012, pp. 371-384.

Hirsch, Matthew, et. al., "BiDi Screen: A Thin, Depth-Sensing LCD for 3D Interaction using Light Fields", with appendix. ACM Transactions on Graphics (ToG), vol. 28, No. 5, (2009), 10 pages.

Bannò, Filippo, et. al., "Real-Time Compression of Depth Streams through Meshification and Valence-Based Encoding". Proceedings of the 11th ACM SIGGRAPH International Conference on Virtual-Reality Continuum and Its Applications in Industry, Dec. 2012, 8 pages.

Chen, Ying, et. al., "Next-Generation 3D Formats with Depth Map Support". In IEEE MultiMedia, vol. 21, No. 2, Apr. 2014, 5 pages.

Alexiadis, Dimitrios, S., et. al., "Real-Time, Full 3-D Reconstruction of Moving Foreground Objects from Multiple Consumer Depth Cameras". IEEE Transactions on Multimedia, vol. 15, No. 2, Feb. 2013, pp. 339-358.

Fu, Jingling, et. al., "Kinect-Like Depth Data Compression". IEEE Transactions on Multimedia, vol. 15, No. 6, Oct. 2013, pp. 1340-1352.

Kuster, Claudia, et, al., "FreeCam: A Hybrid Camera System for Interactive Free-Viewpoint Video". Vision, Modeling, and Visualization, (2011), 8 pages.

Mekuria, Rufael, et. al., "Enabling Geometry Based 3D Tele-Immersion with Real-Time Mesh Compression and Linear Rateless Coding". IEEE Transactions on Multimedia, Dec. 2014, 14 pages.

Yang, Zhenyu, et. al., "Enabling Multi-party 3D Tele-immersive Environments with ViewCast". In ACM Transactions on Multimedia Computing, Communications and Applications, vol. 6, No. 2, (2010), pp. 111-139.

(56) References Cited

OTHER PUBLICATIONS

Zhang, Cha, et. al.,"Viewport: A Distributed, Immersive Teleconferencing System with Infrared Dot Pattern". IEEE Multimedia, vol. 20, No. 1, Jan.-Mar. 2013, pp. 17-27.
Fuchs, Henry, et. al., "Virtual Space Teleconferencing using a Sea of Cameras" Leonard McMillan University of North Carolina at Chapel Hill, (1994).
Nguyen, David, "MultiView: Spatially Faithful Group Video Conferencing", Mar. 23, 2005.
Feldmann, I. et al., "Immersive Multi-User 3D Video Communication" (2009).
Zhang, Cha, et. al., "Viewport: A Fully Distributed Immersive Teleconferencing System with Infrared Dot Pattern". IEEE MultiMedia, vol. 20, Issue: 1, Jan.-Mar. 2013.
Kato, Hirokazu, et. al., "Marker Tracking and HMD Calibration for a Video-based Augmented Reality Conferencing System" Oct. 1999.
Yang, Ruigang, et. al, "Interactive 3D Teleconferencing with User-adaptive Views". ETP '04, Oct. 15, 2004, ACM 1-58113-933-0/04/0010.
Fuchs, Henry, et. al, "Group Tele-Immersion". Department of Energy ASC Views Program, University of Kentucy, last updated May 1, 2005.
Maimone, Andrew, et. al., "Enhanced Personal Autostereoscopic Telepresence System Using Commodity Depth Camera". Preprinted submitted to Computers & Graphics, Sep. 3, 2012, 18 pages.
Billinghurst, Mark, et. al. "Collaborative Augmented Reality". Communications of the ACM, Jul. 2002, vol. 45 No. 7, 8 pages.
Kantonen, Tuomas, et. al., "Mixed Reality in Virtual World Teleconferencing", IEEE, Virtual Reality Mar. 20-24, 2010, 978-1-4244-6236-0/10. Available at: http://virtual.vtt.fi/virtual/proj2/multimedia/media/publications/kantonen-2010.pdf.
Regenbrecht, Holger, et, al., "An Augmented Virtuality Approach to 3D Videoconferencing". Proceedings of the Second IEEE and ACM International Symposium on Mixed and Augmented Reality (ISMAR '03) 0-7695-2006-5/03, (2003), IEEE, pp. 1-2.
Yang, Jason, et al., "A Real-Time Distributed Light Field Camera". Eurographics Workshop on Rendering, (2002), 10 pages.
Nguyen, David, et. al. "MultiView: Improving Trust in Group Video Conferencing Through Spatial Faithfulness". CHI 2007, Apr. 28-May 3, 2007, ACM 978-1-59593-593-9/07/0004, 10 pages.
Yang, Ruigang, et al. "Creating Adaptive Views for Group Video Teleconferencing—An Image-Based Approach". Copyright (2002) ACM 1-58113-640-4/02/12, 4 pages.
Brar, Rajwinder, "Head Tracked Multi User Autostereoscopic 3D Display Investigations". Ph.D. Thesis; De Montfort University, (2012), 193 pages.
International Search Report and Written Opinion of the International Searching Authority for PCT/US2017/038820 dated Nov. 7, 2017.
International Search Report and Written Opinion of the International Searching Authority for PCT/US2017/047605 dated Oct. 27, 2017.
International Preliminary Report on Patentability for PCT/US2016/046848 dated Mar. 1, 2018.
Nguyen, David, et. al., "MultiView: Spatially Faithful Group Video Conferencing". Proceedings of the 2005 Conference on Human Factors in Computing Systems (CHI'05) Apr. 2-7, 2005.
Written Opinion of the International Preliminary Examining Authority for PCT/US2017/038820, dated May 30, 2018.
International Search Report and Written Opinion of the International Searching Authority for PCT/US2018/035435 dated Sep. 10, 2018.
International Preliminary Report on Patentability for PCT/US2017/038820 completed on Sep. 12, 2018.
Avrahami, Daniel, et. al., "Supporting Multitasking in Video Conferencing using Gaze Tracking and On-Screen Activity Detection". Proceedings of the 21st International Conference on Intelligent User Interfaces, Mar. 7-10, 2016. ACM 978-1-4503-4137-0/16/03, 5 pages.

Siltanen, Pekka, et. al., "An Architecture for Remote Guidance Service". VTT Technical Research Centre, (2015), pp. 288-297.
Lanier, Jaron, "Virtually There". Scientific American, Apr. 2001, 16 pages.
Buxton, William, "Telepresence: integrating shared task and person spaces". Proceedings of Graphics Interface '92, (1992), pp. 123-129.
Vertegaal, Roelm "The GAZE Groupware System: Mediating Joint Attention in Multiparty Communication and Collaboration". In Proceedings of CHI'99, Conference on Human Factors in Computing Systems, (1999), 8 pages.
Kristoffersson, Annica, et. al., "A Review of Mobile Robotic Telepresence". Hindawi Publishing Corporation Advances in Human-Computer Interaction vol. 2013, (2013), pp. 1-17.
Moons, Theo, et. al., "3D Reconstruction from Multiple Images Part 1: Principles", Foundations and Trends in Computer Graphics and Vision, vol. 4, No. 4, (2008), 37 pages.
Baričević, Domagoj, et. al., "A Hand-Held AR Magic Lens with User-Perspective Rendering". IEEE International Symposium on Mixed and Augmented Reality (ISMAR), (2012), 10 pages.
Dou, Mingsong, et. al., "Room-sized Informal Teiepresence System". IEEE Virtual Reality, (2012), pp. 15-18.
Zomet, Assaf, et. al., "Mosaicing New Views: The Crossed-Slits Projection". IEEE Transactions on Pattern Analysis and Machine Intelligence, vol. 25, No. 6, Jun. 2003, pp. 741-754.
Tola, Engin, et. al., "Virtual View Generation with a Hybrid Camera Array". CVLAB-Report-2009-001, EPFL, (2009), 20 pages.
Kimber, Don, et. al., "FlyAbout: Spatially Indexed Panoramic Video". Proceedings of The Ninth ACM International Conference on Multimedia, Oct. 2001, 10 pages.
Kurashima, Celso., et. al. "Combining Approximate Geometry with View-Dependent Texture Mapping—A Hybrid Approach to 3D Video Teleconferencing" Proceedings. XV Brazilian Symposium on Computer Graphics and Image Processing, (2002).
Certified U.S. Appl. No. 62/357,060, filed Jun. 30, 2016.
International Search Report and Written Opinion of the International Searching Authority for PCT/US2016/046848, dated Nov. 9, 2016, 12 pages.
Vertegaal, Roel, et. al., "GAZE-2: Conveying Eye Contact in Group Video Conferencing Using Eye-Controlled Camera Direction". Proceedings of the SIGCHI conference on Human factors in computing systems, (2003), 8 pages.
Lehment, Nicolas, et. al. "Creating Automatically Aligned Consensus Realities for AR Videoconferencing". IEEE International Symposium on Mixed and Augmented Reality (ISMAR), (2014), 6 pages.
Eisert, Peter, "Immersive 3-D Video Conferencing: Challenges, Concepts, and Implementations". Proceedings of SPIE Visual Communications and Image Processing (VCIP), Jul. 2003, 11 pages.
Klein, Georg, et. al., "Parallel Tracking and Mapping for Small AR Workspaces". In 6th IEEE and ACM International Symposium on Mixed and Augmented Reality, ISMAR, (2007), 10 pages.
Milgram, Paul, et. al., "A Taxonomy of Mixed Reality Visual Displays". IEICE Transactions on Information Systems, vol. E77-D, No. 12, Dec. 1994, pp. 1-15.
Fuchs, Henry, et. al., "Immersive 3D Telepresence". IEEE Computer Society,, Jul. 2014, pp. 46-52.
International Preliminary Report on Patentability for PCT/US20171047605 dated Feb. 26, 2019, 10 pages.
Wang, Xiangyu., et. al., "Mutual awareness in collaborative design: An Augmented Reality Integrated Telepresence System". Computers in Industry, vol. 65, (2014), pp. 314-324.
Deshpande, Sachin, "On-Display Spatial Audio for Multiple Applications on Large Displays". Proceedings of the 2nd ACM International Workshop on Immersive Media Experiences, ACM, (2014), pp. 19-22.
Okada, Ken-ichi, et. al. "Multiparty Videoconferencing at Virtual Social Distance: MAJIC Design". Proceedings of the 1994 ACM Conference on Computer Supported Cooperative Work, (1994), pp. 385-393.
Panacast, "Panacast 2 B6 Wide Angle Video Conference Camera". Web Archive dated Jul. 31, 2015, available at: https://web.archive.

(56) References Cited

OTHER PUBLICATIONS org/web/20150731015305/https://www,videoconferencegear.com/panacast-2-4k-video-conference-camera-ultra-wide-angle-180-degrees/, 3 pages.

Saffar, Mohammad, "Logitech Webcarn ECC950 A Conference Cam", YouTube link, published on Mar. 26, 2012, 40 pages.

Written Opinion of the International Preliminary Examining Authority for PCT/US2018/035435 dated Jun. 3, 2019, 10 pages.

International Preliminary Report on Patentability for PCT/US2018/035435 completed on Sep. 12, 2019, 17 pages.

Omnijoin, "White Paper: How to Get More Out of Your Telepresence Installation with Unified Interoperable Video Conferencing Technology". An OmniJoin White Paper, (2016), pp. 1-8.

Dong, Li, "Three Trends Driving Videoconferencing Technologies Forward". Huawei, (2012), pp. 1-7.

Kauff, Peter, et. al., "An Immersive 3D Video-Conferencing System Using Shared Virtual Team User Environments." In Proceedings of the 4th International Conference on Collaborative Virtual Environments, (2002), pp. 105-112.

Second Life Wiki. "Streaming Video in Second Life." Retrieved from http://wiki.secondlife.com/wiki/Streaming_Video_in_Second_Life#Streaming_Video_into_Second_Life, last modified Apr. 16, 2016, 10 pages.

Prisco, Giulio, "Second Life, Viewer 2.0." Retrieved from http://giulioprisco.blogspot.com/2010/02/second-life-viewer-20.html, Feb. 23, 2010, 7 pages.

Hayden, Scott, "Mobile VR Headset Veeso Aims to Bring Face Tracking to VR." Retrieved from http://www.roadtovr.com/mobile-headset-veeso-aims-bring-face-tracking-vr, Jul. 25, 2016, 4 pages.

Simonite, Tom, "Oculus Rift Hack Transfers Your Facial Expressions onto Your Avatar." Retrieved from https://www.technologyreview.com/s/537566/oculus-rift-hack-transfers-your-facial-expressions-onto-your-avatar/, May 20, 2015, 9 pages.

Pan, Ye, et. al., "A Gaze-Preserving Situated Multiview Telepresence System." In Proceedings of the SIGCHI Conference on Human Factors in Computing Systems (CHI '14), Apr. 26-May 1, 2014, pp. 2173-2176.

Kovach, Ron, "Interview with Mia Lewin and Bill Hanley of Kontor. Neocon 2016." Design Applause, retrieved from https://designapplause.com/design/interview-with-mia-lewin-and-bill-hanley-of-kontor-neocon-2016/197983/, Jun. 11, 2016, pp. 1-7.

Wikipedia, "Voronoi diagram." Wikipedia, retrieved from: https://en.wikipedia.org/w/index.php?title=Voronoi_diagram&oldid=642351381, edited on Jan. 13, 2015, 10 pages.

"Getting Started with the Graph Partitioning Code." Retrieved from https://www.math.ksu.edu/~albin/matlab_html/graph_partitioning/gp_demo.html, Nov. 21, 2014, 15 pages.

"3DPresence: The 3D Telepresence and 3D-Aware Next Generation Immersive Videoconferencing Project." Internet Archive. Captured on Apr. 15, 2012. Retrieved from https://web.archive.org/web/20120415233329/http:/www.3dpresence.org/index.php.

Divorra, Oscar, et. al., "Towards 3D-Aware Telepresence: Working on Technologies Behind the Scene". Submitted to CSCW'10, Feb. 6-10, 2010, 4 pages.

\* cited by examiner

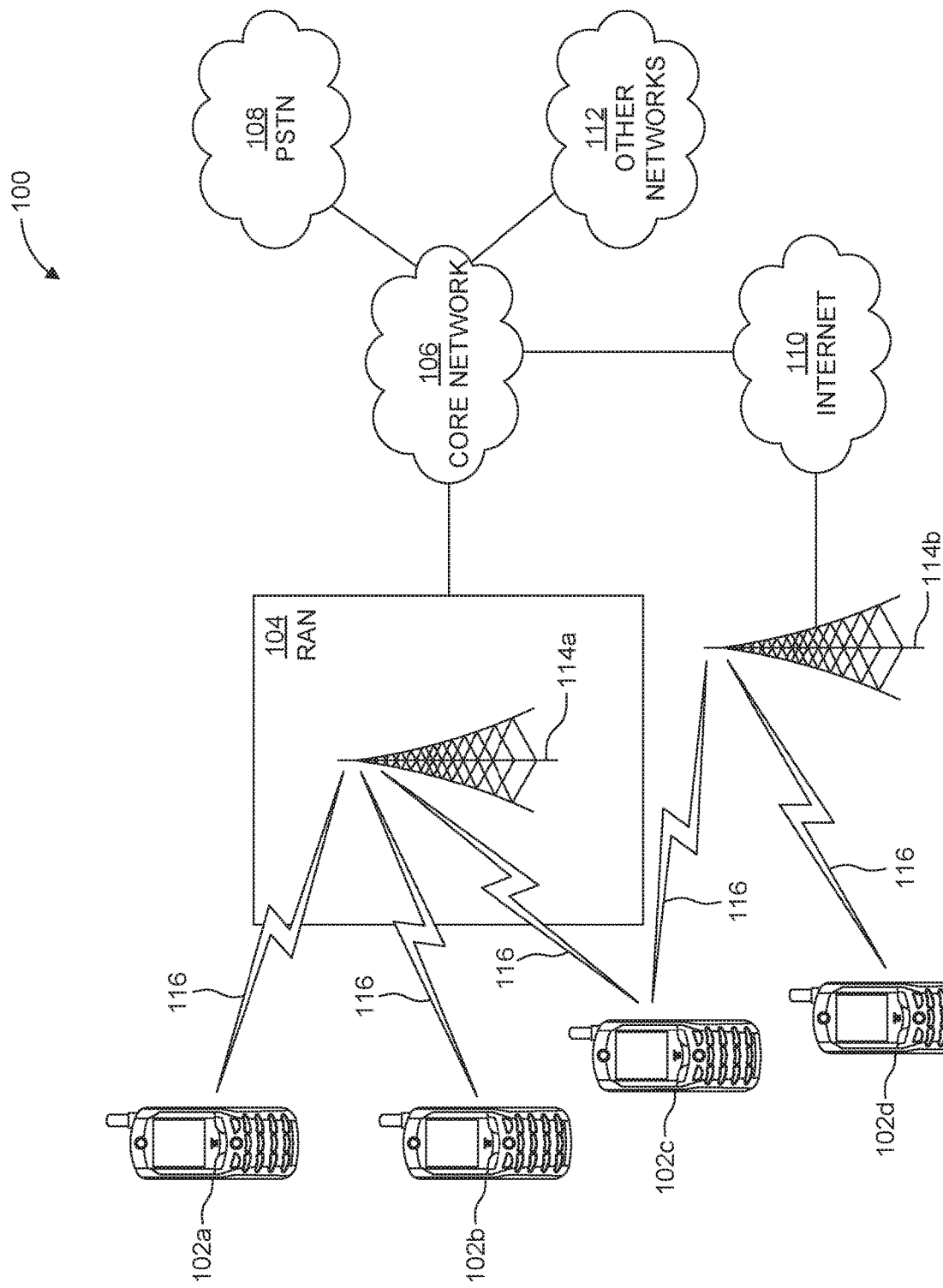

SPATIALLY FAITHFUL TELEPRESENCE SUPPORTING VARYING GEOMETRIES AND MOVING USERS

CROSS-REFERENCE TO RELATED APPLICATIONS

The present application is a national stage application under 35 U.S.C. 371 of International Application No. PCT/US2018/035435, entitled "SPATIALLY FAITHFUL TELEPRESENCE SUPPORTING VARYING GEOMETRIES AND MOVING USERS", filed on May 31, 2018, which claims benefit under 35 U.S.C. § 119(e) from U.S. Provisional Patent Application Ser. No. 62/517,686, entitled "Spatially Faithful Telepresence Supporting Varying Geometries and Moving Users," filed Jun. 9, 2017, the entirety of which is incorporated herein by reference.

BACKGROUND

Spatial faithfulness is a system's ability to preserve spatial relationships between people and objects. In many telepresence systems, participants of the telepresence session have the impression of being in the same meeting geometry. Many of these systems require a fixed geometry (or placement) between users and restrict the number of participants per meeting site/session. Many telepresence systems may be divided into a few classes, depending on the way these systems merge (or compile the views from) remote sites and users for each local site.

SUMMARY

Some embodiments of a method may include: for each of a plurality of users, receiving a three-dimensional (3D) local environment scan of the local environment of the respective user; mapping each of the plurality of local environment scans to a respective location and orientation in a shared virtual geometry; responsive to receiving an environment-movement input from a controlling user, modifying at least one of the location and the orientation of the local environment scan of the controlling user with respect to the shared virtual geometry; tracking a perspective location of at least one viewing user in the shared virtual geometry; and generating a two-dimensional (2D) perspective video of the shared virtual geometry from the perspective location of the viewing user.

For some embodiments, mapping the shared virtual geometry may include: aligning each of the plurality of local environment scans to a common origin; and orienting each of the plurality of local environment scans to a common direction, wherein the shared virtual geometry may overlap each of the plurality of local environment scans.

For some embodiments, mapping the shared virtual geometry may include: aligning each of the plurality of local environment scans to a separate point in a grid; and orienting each of the plurality of local environment scans to a common direction, wherein each of the plurality of local environment scans may be assigned to a point in the grid.

For some embodiments, tracking the perspective location of at least one viewing user in the shared virtual geometry may include: modifying the location for each of the plurality of users in the shared virtual geometry based on movement of each of the plurality of users; modifying the shared virtual geometry based on a plurality of user commands; and tracking the location and the orientation of at least one viewing user in the modified shared virtual geometry.

For some embodiments, generating the two-dimensional (2D) perspective video of the shared virtual geometry from the perspective location of the viewing user may include: determining a distance in the shared virtual geometry between a first user selected from the plurality of users and a second user selected from the plurality of users; and responsive to determining that the distance between the first and second users is less than a threshold: selecting a resolution for a representation of the 2D perspective video; and creating the 2D perspective video based on the resolution selected.

For some embodiments, a method may further include computing a combined video combining a background image with the 2D perspective video of the shared virtual geometry from the perspective location of the viewing user.

For some embodiments, a method may further include transmitting the combined video to a first user selected from the plurality of users.

For some embodiments, a method may further include: receiving an audio signal from a first user corresponding to a location and listening direction of a first user, following a change in a location and listening direction of a second user; computing an audio signal corresponding to the location and listening direction of the second user; and transmitting the computed audio signal to the second user.

For some embodiments, a method may further include: receiving a 2D perspective video from another user; decoding the 2D perspective video received from another user to generate a decoded 2D perspective video; augmenting the decoded 2D perspective video with additional content to generate an augmented, 2D perspective video; encoding the augmented, 2D perspective video to generate an encoded 2D perspective video; and transmitting the encoded 2D perspective video to a server.

For some embodiments, a method may further include: transmitting to each of the plurality of users the position of at least one of a plurality of other users within the shared virtual geometry; receiving, from a first user, a two-dimensional (2D) video corresponding to a location, a viewing direction, and a position change of a second user in a spatially faithful way; and transmitting, to the second user, the 2D video received from the first user and a background.

For some embodiments, a method may further include: computing a combined 2D perspective video that combines a background with one of the 2D perspective videos; and displaying the combined 2D perspective video.

For some embodiments, a method may further include: receiving information from a remote user selected from one of the plurality of users for changing a location of a local environment geometry within the shared virtual geometry; selecting a new background for a background associated with the location indicated by the information received from the remote user; and replacing the background of the combined 2D perspective video with the new background.

For some embodiments, a method may further include: detecting an object obstructing a view of a first user selected from the plurality of users from a perspective location of a second user selected from the plurality of users; removing the object from the shared virtual geometry; and generating an updated 2D perspective video without the object of the shared virtual geometry from the perspective location of the second user.

For some embodiments, a method may further include: receiving one of the 2D perspective videos; and displaying the 2D perspective video received.

Some embodiments of an apparatus may include: a processor; and a non-transitory computer-readable medium storing instructions that are operative, when executed on the processor, to perform a method listed above.

BRIEF DESCRIPTION OF THE DRAWINGS

FIG. 20 is a system diagram illustrating an example communications system in which one or more disclosed embodiments may be implemented according to some embodiments.

Figure 2:
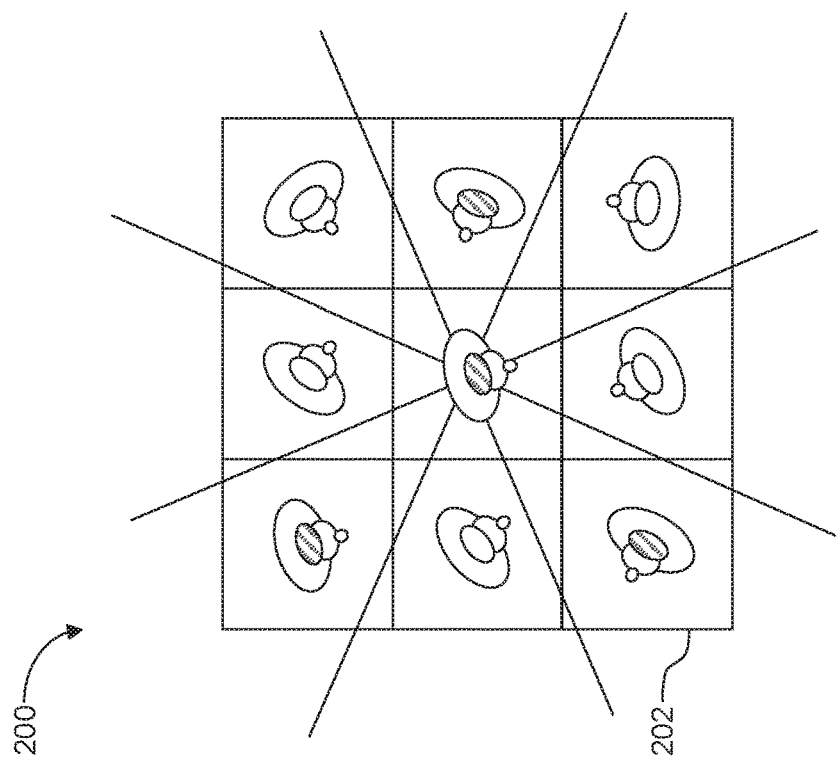
FIG. 2 is a schematic plan view illustrating an example tessellated space for a user with square cells in a rectangular arrangement of capture cameras according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

A goal of spatially faithful telepresence is for participants of the telepresence session to have the impression of being in the same meeting geometry. Some previous systems use spatial orientation with external (non-wearable) 2D display-based systems. 2D displays lack cues for perceiving depth (e.g., motion parallax) or for immersion and spatial orientation. Some previous 2D display-based systems use standardized backgrounds and meeting tables at all meeting sites to create the illusion of a shared meeting space. Some previous systems handled the problem of horizontal parallax by using multiple cameras at each meeting site and by compiling the remote views using views from frontal perspectives.

While some 3D display technologies have improved spatial faithfulness for telepresence systems, many of these systems require a fixed geometry (or placement) between users and restrict the number of participants per meeting site/session.

Augmented reality (AR) and virtual reality (VR) glasses-based systems may support spatially faithful perception. Views from remote places may be brought to a users eye-point, and immersion may be supported by enabling users to view a whole 360° panorama (although a sub-view may be relatively narrow at a time due to the restricted field-of-view of AR glasses).

AR glasses may avoid, as perceived by the eyes, imperfect summation of depth and directions from an external display (or a view from a remote space) and depth and directions from a local space. An example of imperfect summation occurs when seeing a view of a remote space on a 2D display at a local 3D space, producing distortions of flattening ("cardboarding") and loss of directions ("Mona Lisa effect"). With AR glasses, merging of local and remote views may be controlled and views with stereoscopic depths may be supported.

Many telepresence systems may be divided into a few classes, depending on the way they merge (or compile the views from) remote sites and users for each local site. Some systems use a window paradigm and other systems use a proxy-based system.

Some systems support spatial faithfulness by standardizing meeting room layouts, equipment, and appearances (for example the color and texture of the background) in order to produce for the participants an illusion of sharing the same space. The local meeting table is also extended to tables at the remote sites.

Many previous systems do not provide users with correct user-centric views (views from viewer's eye-point and perspective) as seen through a real window. Most of these systems approximate this view by a camera view, which is not aligned with the users' eye-point. Some systems provide user centric views, even for multiple people per site, by reconstructing each meeting site real-time in 3D, and providing each receiver a user-centric/dependent view to this reconstruction. Such systems may have a high processing power requirement for 3D reconstruction. Further challenges are hardware complexity and a high bitrate requirement when transmitting 3D captured data.

Eye-contact between participants can be achieved in rather simple way by assigning to each remote user in the local space a proxy device with a display (for the face) and a camera (for the eyes). However, if geometries are not the same across meeting sites, the perception of any other eye-directions than direct eye-contact(s) is ambiguous, so that for instance the person to the left of a participant is not the same at different sites. In addition, if using external 2D displays, support for real user-centric views (individual views from correct eye-points) is not provided.

Some previous systems use a method that makes a real-time 3D reconstruction of each remote site with its participants and provides user-centric views as perspectives to this 3D model. Such systems may have difficulty with providing individual 3D views for multiple local participants, providing multiple 3D view displays, or providing support for holographic displays. Such devices may be restricted by quality, price, or availability, and previous systems may support only one user per site with an autostereoscopic display. Users may wear AR/VR glasses, which are able to bring proxy camera views directly to each receivers eye-point. AR glasses may provide up to 360° panoramas around the user, even in stereo (S3D).

3D virtual worlds, for example Second Life and Open-Qwaq (formerly known as Teleplace), are a way of interaction between people represented by avatars. Attempts have been made to bring naturalness to the interaction by making avatars and environments close to their real-world exemplars. Avatars share the same spatial environment, which removes the challenge of merging separate meeting environments. Such systems lack physical perception of objects and spaces and create an unnatural environment for video conferencing.

One difference of such systems to real-world interaction is the way avatars are controlled. In virtual worlds, their movement may not be copied directly from humans, but instead, avatars are remote controlled, such as by mouse and keyboard interaction. This method tends to prevent a user experience from being real and in person. Many previous systems to automate avatar control by motion capture or similar technologies lack quality and naturalness.

Methods and systems for spatially faithful telepresence disclosed herein support a flexible system of adjustable geometric relationships between multiple meeting sites with multiple mobile participants (or users). Some embodiments of such methods and systems may be used for group conferencing and visitations inside a user-selected, photo-realistic 3D-captured or 3D-modelled user environment. Some embodiments of such methods and systems may be used for social interaction and spatial exploration inside a unified virtual landscape with a dynamic unified geometry compiled from separate user spaces, which may enable proximity-based interactions (triggered by distances and/or directions between users or spaces), and is expanded by virtual 3D-modeled environments, 3D objects, and other digital information.

The more meeting spaces and participants are brought together, the more challenging it becomes to support participants by an unrestricted natural experience in moving and viewing around. If unifying separately captured spaces, their positions and orientations may be optimized for maximum visibility between participants and to avoid virtual collisions with other participants and furniture.

A unified geometry depends on the varying number, layout, and orientation of participating sites, and the varying number, position, and orientation of their occupants. The geometry may be both complex and dynamic, so advanced management methods and systems may be called for.

Problems in Many Previous Systems

Many previous spatially faithful systems have several of the following problems. Many of these previous spatially faithful systems support only one user per site. Many of these previous systems also lack support for a large number of users. User positions are fixed (a priori) with respect to local spaces, coordinate systems, and geometries between sites and users. Users are captured and displayed in the real physical scale. Position and dimension of capture setups determine local coordinate systems, including origin and cardinal direction. Each user must sit in a specific position in the local space with respect to the capture setup. For many such previous systems, a user lacks the freedom to move with respect to local coordinates, except for changing his or her viewing direction by turning his or her head (such as a user sitting on a rotating seat). Many such previous systems also lack support for user mobility and lack support for meeting space mobility (such as modifying spatial position and orientation of themselves and their meeting space/site within a unified geometry of sites).

Many immersive conferencing systems which provide spatial consistent video limit the number of users and limit flexibility of geometries. Many such systems also have problems with building up and managing a dynamic space for spatially faithful interactions. Many such systems lack support for a larger number of sites. For instance, many previous spatially faithful systems based on a virtual window interface support only four or fewer sites. Also, many such systems lack the ability to maintain spatially faithful interactions while allowing movement of individuals as well as virtual relocation of their sites.

Many previous spatially faithful telepresence systems are able to support conferencing and interaction only between a small number of spatially-oriented participants (for example, up to six participants). Many previous systems support correct viewpoints for only one user per site. These users are typically not able to move freely but are bound to some exact positions related to the meeting setup. Also, for many previous systems, the maximum number of meeting sites is limited to only a few nodes. While these limitations may not apply to conferencing in virtual worlds, such systems lack naturalness both visually and for control of avatars (virtual representatives of users).

While many previous telepresence systems support group conferencing (people meeting to discuss a topic), previous spatially faithful telepresence systems limit the number of participating sites and users. Hence, social networking for a large number of people may not be supported. Many virtual world systems lack user context to an interaction, such as a user's physical appearance and environment.

Many previous spatially faithful telepresence systems have limited support for user mobility. Systems and methods disclosed herein support meeting space mobility, as well as spatially faithful functionalities for social interaction between a large number of sites and users. Differing from virtual worlds, some example systems disclosed herein enable users to move and navigate in ways natural to an end user, both physically and virtually. Such mobility may be inside photorealistic captures of remote spaces, either by visiting them separately, or by navigating inside a metric landscape (with real world-like scale and orientations) compiled from separate spaces.

A user's physical context may be captured by cameras or sensors, which may occur in real-time. Room-sized spaces may be captured and modeled in real-time and in natural scale using existing 3D capture and reconstruction methods such as those disclosed in C. Kuster, et al., *FreeCam: A hybrid camera system for interactive free-viewpoint video*, VISION, MODELING, AND VISUALIZATION (VMV) 2011 pp. 17-24 (2011) and Andrew Maimone & Henry Fuchs, *Real-Time Volumetric 3D Capture of Room-Sized Scenes for Telepresence*, 3DTV CONFERENCE 2012 (Oct. 15-17, 2012). One challenge is combining those multiple captured spaces and their occupants into a unified 3D geometry and to provide spatial orientation over a network. Another challenge may be bringing a large number of spaces together due to processing power, connection bandwidth, and latency limitations. Systems and methods disclosed herein supports spatial faithfulness in both group conferencing and social networking with a large number of spaces and users.

Coding and transmission of real-time captured 3D data may use much more bandwidth than real-time video. For example, raw data bitrate of video depth data (such as red green blue-depth (RGB-D) or time-of-flight (ToF) data) measured by a sensor may be 300 MB/s (9.83 MB per frame). The amount of compressed data to represent real-time captured depth sensor data (color plus depth) may be bigger than video feeds from a video camera. Multi-sensor systems, compared to multi-camera systems, may have a similar problem. Therefore, bitrates may be reduced for a spatially faithful system that transfers a small number of videos instead of real-time 3D data.

Many previous spatially faithful telepresence systems have limited support and understanding of user mobility. Systems and methods disclosed herein expand mobility to include users' ability to move around and to move and orient renderings of their locally captured spaces with respect to other participants. Types of mobility may be classified as two classes: physical mobility and virtual mobility. Physical mobility may include a user changing his or her position (users mobility) inside a meeting space. Virtual mobility may include having a user visiting virtually ("teleporting" him/herself into) another meeting space, and a system or a user changing location of his or her meeting space in a unified virtual geometry. Hence, virtual mobility may have subclasses for user mobility and meeting space mobility. Many previous systems do not support meeting space mobility because many previous systems support only a small number of sites in fixed settings.

Many previous systems do not support spatial faithfulness between multiple or large number of meeting sites and participants, especially by current external display-based implementations. Many previous systems creating virtual worlds may support a large number of users but lack support for spatial faithfulness. Systems and methods disclosed herein support more natural visual appearances and ways of interaction while supporting a large number of users without restricting positions in a meeting space.

Many previous systems lack support for users to adjust, visit, navigate, and interact inside dynamic spatially faithful geometries and lack ways of forming photorealistic spatially faithful geometries by aligning large number of 3D captured sites and users (e.g., hundreds of sites with even multiple users per site). Many previous systems have limited support for user mobility, with no support for meeting space mobility. For some embodiments disclosed herein, support of meeting space mobility for moving virtual renderings of physical spaces is not restricted by physical constraints. Also, many previous systems lack support of large meeting sessions with many spaces. For systems and methods disclosed herein, bitrates may be reduced for support of distributed and dynamic geometries.

Some embodiments of methods and systems disclosed herein use 3D scans of a physical location as a building block (or geometry element). Some embodiments place a local environment into a shared virtual geometry either overlapping or adjacent to others. Some embodiments use location tracking to enable construction from variable viewpoints for various numbers of users and locations. Some embodiments enable modifications and movements between different elements of a shared space. Some embodiments exchange low bitrate 2D video projections based on tracked positions in a unified geometry.

Tessellated Spaces

Figure 1:
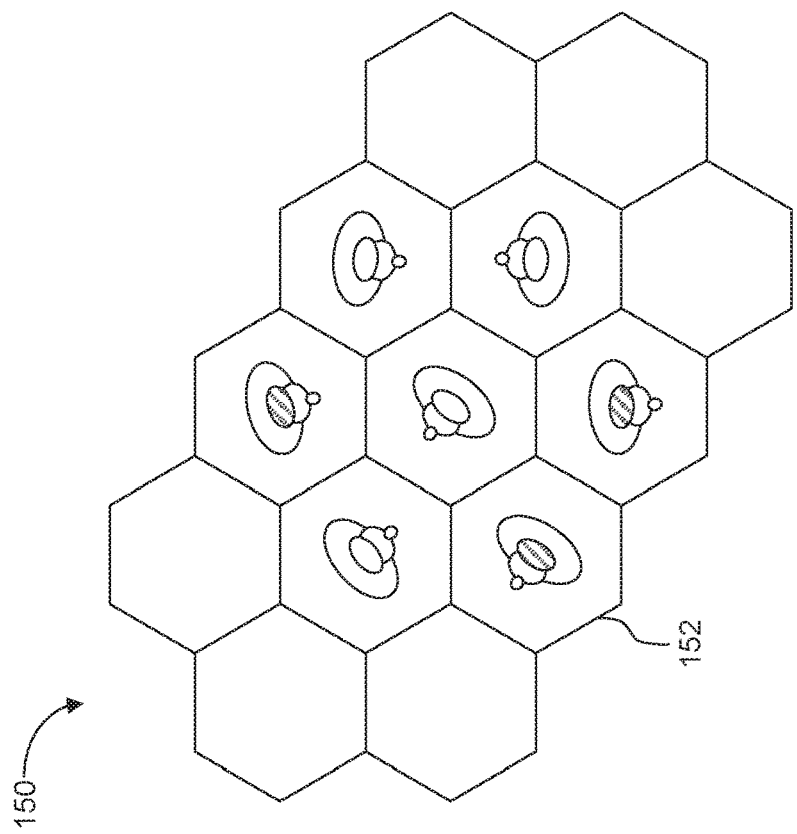
FIG. 1 is a schematic plan view illustrating an example tessellated space for a user with hexagon cells in a hexagonal arrangement according to some embodiments.

Some systems using tessellated spaces support spatially faithful geometrical relationships between a number of sites and users. Those virtual geometries may be formed by repeating a geometric shape, called a cell, and providing a representation of each user from several viewpoints. The cell may be, for example, a hexagon or a square, as illustrated in FIGS. 1 and 2. Using an omnidirectional capture setup, the system may place each cell and its occupant relatively freely for flexibly relating to each other. Users are captured in their real environments and their representations are positioned beside each other into neighboring cells. Vertices between cells are like virtual windows between neighboring users. The content of the cell is a user captured in his or her physical environment.

FIG. 1 is a schematic plan view illustrating an example tessellated space 150 for a user with hexagon cells 152 in a hexagonal arrangement according to some embodiments. FIGS. 1 and 2 show examples of users interacting in a tessellated virtual space 150, 200 of hexagons 152 or squares 202 (which may be repeated beyond a 3×3 grid). FIG. 2 is a schematic plan view illustrating an example tessellated space 200 for a user with square cells 202 in a rectangular arrangement of capture cameras according to some embodiments.

Figure 4:
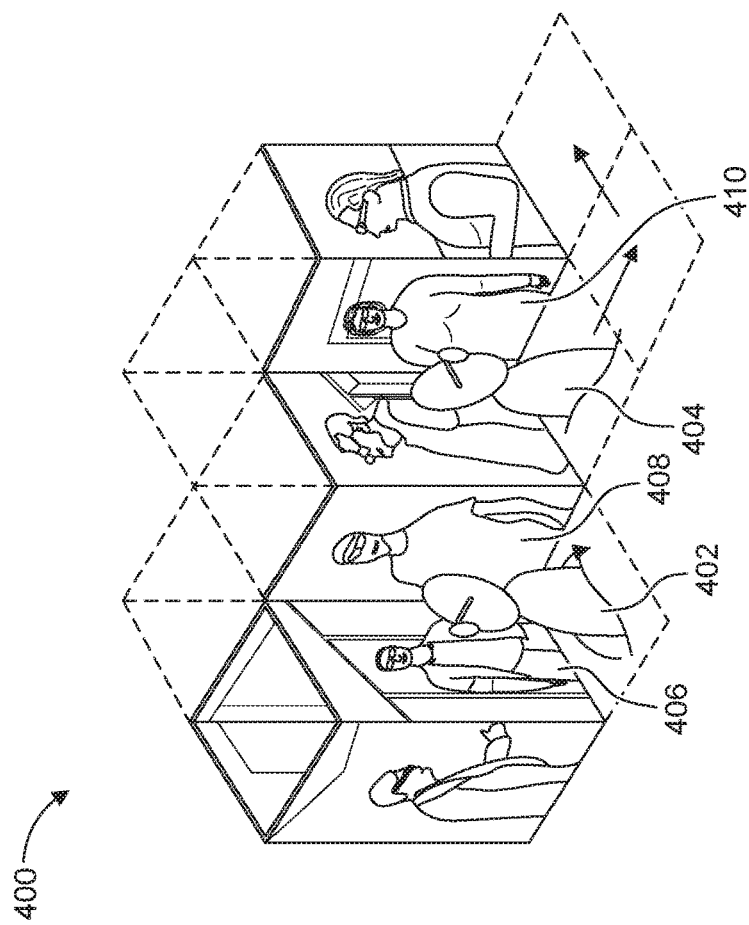
FIG. 4 is a schematic perspective view illustrating an example tessellated space with a user turning and moving to see other users according to some embodiments.
Figure 3:
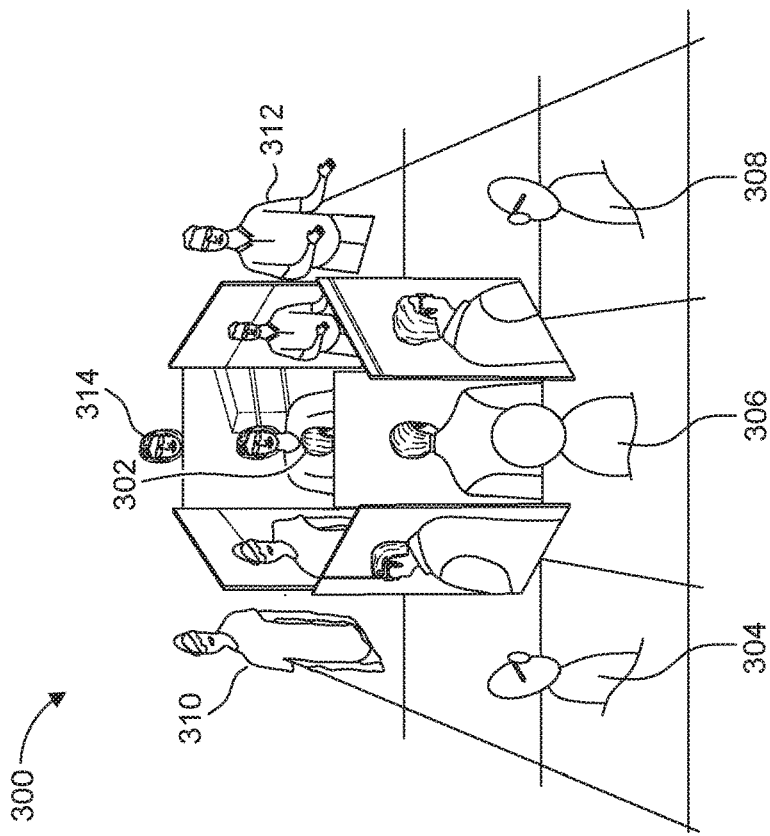
FIG. 3 is a schematic perspective view illustrating an example hexagon-shaped cell in a tessellated space showing how a person located in the middle is seen by neighboring people according to some embodiments.

FIG. 3 is a schematic perspective view illustrating an example hexagon-shaped cell in a tessellated space 300 showing how a person located in the middle is seen by neighboring people according to some embodiments. FIG. 3 shows how a user 302 in the middle is seen by his or her neighboring users 304, 306, 308, 310, 312, 314. FIG. 4 is a schematic perspective view illustrating an example tessellated space 400 with a user turning and moving to see other users according to some embodiments. FIG. 4 illustrates users 402, 404 turning and moving to see different people 406, 408, 410. While only four views are shown from each cell, more views may be used with other cell shapes. Each neighbor sees the user in the middle from their own viewpoint, like people meeting in the real world. FIG. 4 depicts users that are able to move among each other and see existing or new neighbors from varying viewpoints. FIG. 4 may be expanded to show diagonal views of users as shown in FIG. 3.

Figure 5B:
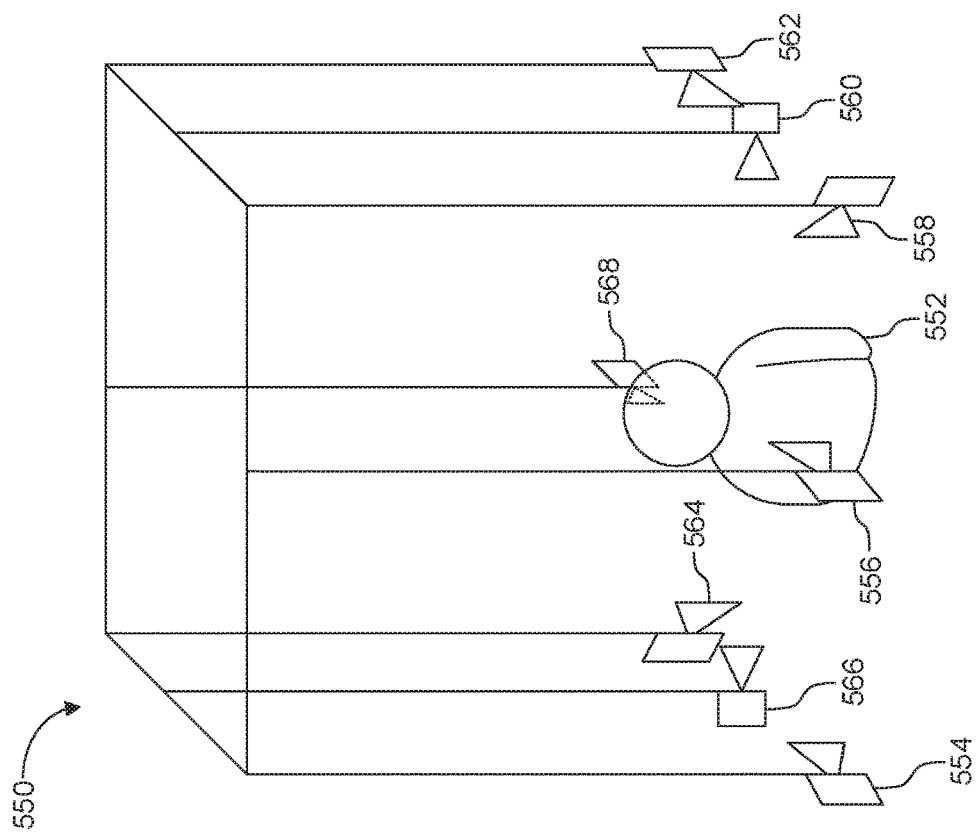
FIG. 5B is a schematic perspective view illustrating an example square capture environment with 8 cameras according to some embodiments.
Figure 5A:
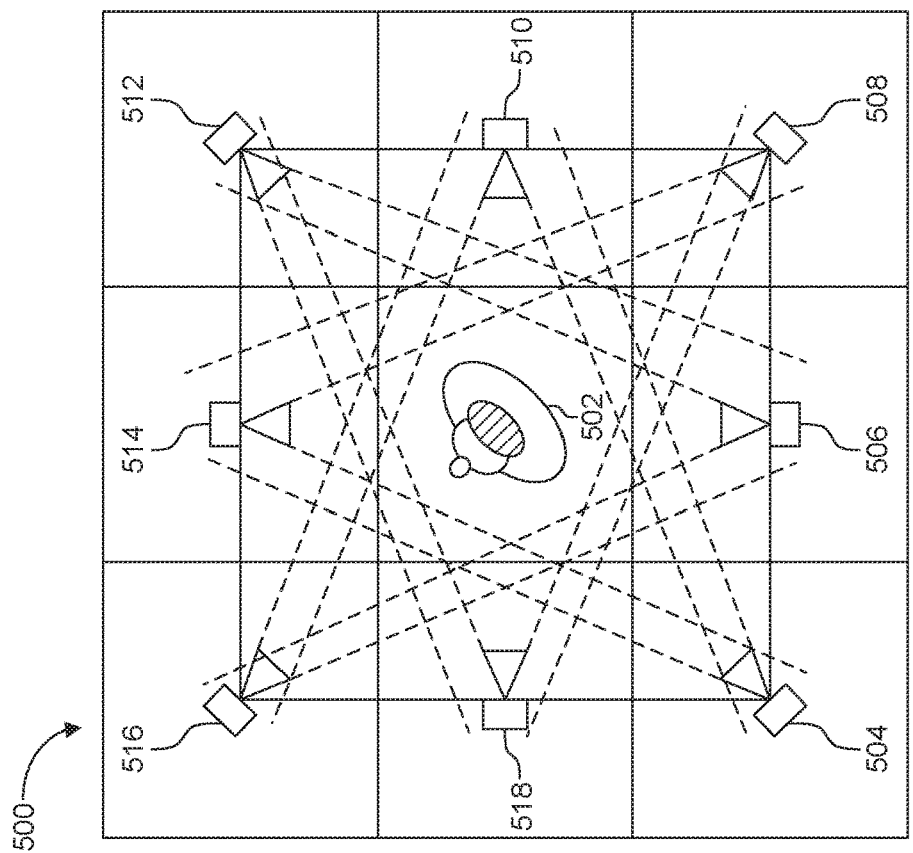
FIG. 5A is a schematic plan view illustrating an example 8-camera capture environment with square cells according to some embodiments.

FIGS. 5A and 5B show an example square grid setup. FIG. 5A is a schematic plan view illustrating an example 8-camera capture environment 500 with square cells according to some embodiments. FIG. 5A shows view lines of cameras 504, 506, 508, 510, 512, 514, 516, 518 for capturing a user 502. Individual viewpoints are formed by capturing each user by an omni-camera setup (which captures views of a user from all directions around a user) and providing the views from respective directions. For some embodiments, an omni-camera setup uses cameras with FOVs of less than 360°. The views (remote person's faces) are shown by AR glasses over each of the cameras (remote person's eyes). FIG. 5B is a schematic perspective view illustrating an example square capture environment 550 with 8 cameras according to some embodiments. FIG. 5B shows an example lightweight frame that may be used to hold in position cameras 554, 556, 558, 560, 562, 564, 566, 568 for capturing a user 552. For some embodiments, a user may have spatially faithful viewpoints only to his or her closest neighbors, captured inside and together with their backgrounds, and viewpoints to those users further away are not supported. Some embodiments may have a view of further away neighbors.

In most previous spatially faithful systems, users are bound to certain spatial positions relating to a telepresence terminal (such as external displays and cameras) in order to send or receive correct spatially-oriented views to or from remote partners. A camera capture setup defines the position of each local user. For some systems, a user is able to move together with the captured scene inside a tessellated virtual geometry. However, the user is not supported with changing viewpoints, for example, when moving inside the local space. A user and his or her local space are bound to the same (although dynamic) coordinate system.

System Components and Architecture

Figure 6:
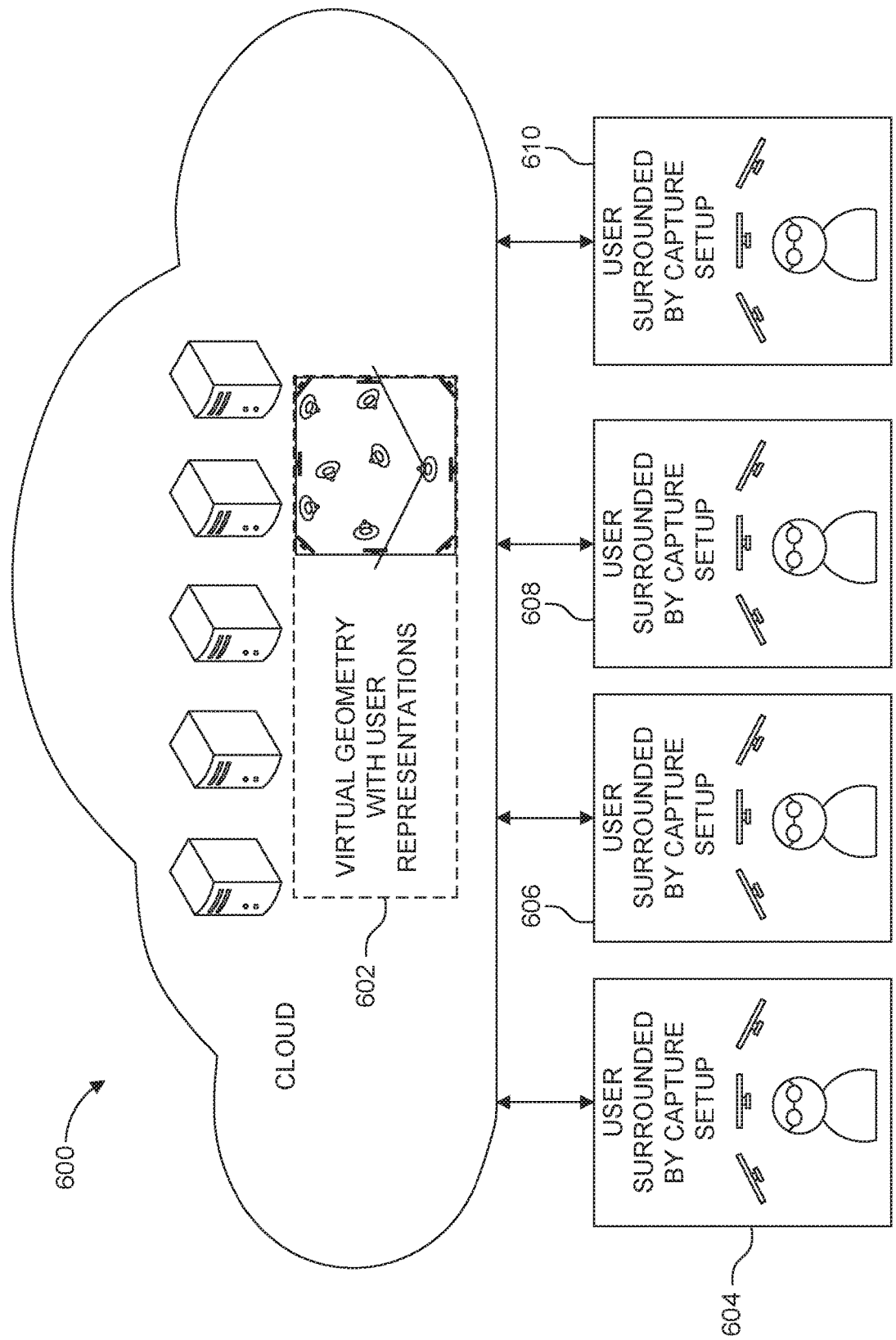
FIG. 6 is a system diagram illustrating an example set of interfaces for representing users in a virtual geometry according to some embodiments.

FIG. 6 is a system diagram illustrating an example set of interfaces for representing users in a virtual geometry according to some embodiments. FIG. 6 shows a system 600 for creating a virtual geometry for user interaction. Systems and methods disclosed herein may be implemented as a decentralized application where tools to manage a virtual constellation (or geometry) with user representations 602 may be implemented in cloud servers, and user capture and display tools 604, 606, 608, 610 may be implemented at each local site, with each user site connected to the cloud via a network.

Figure 7:
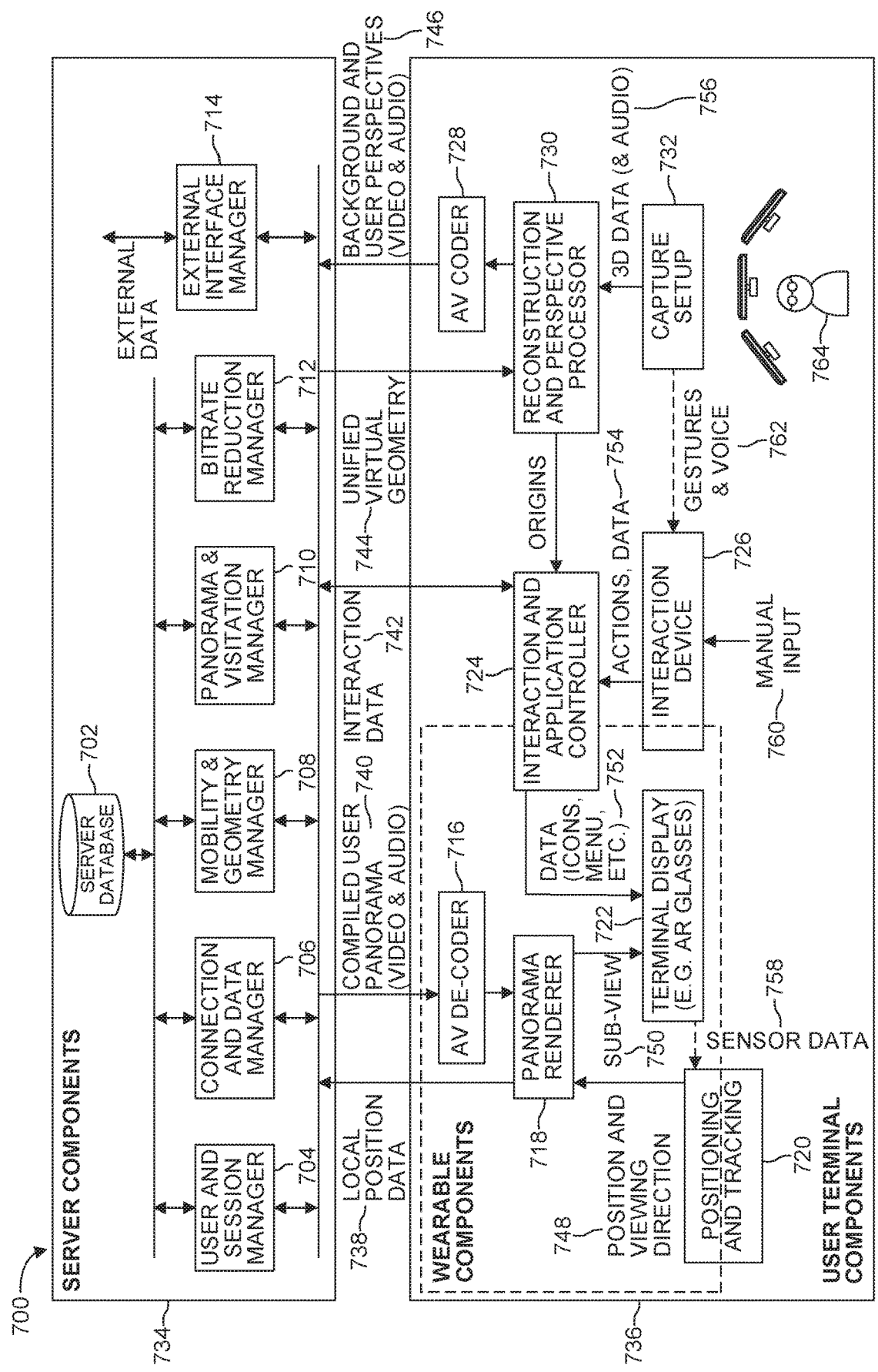
FIG. 7 is a system diagram illustrating an example set of interfaces for capturing and rendering a virtual conference environment according to some embodiments.

FIG. 7 is a system diagram 700 illustrating an example set of interfaces for capturing and rendering a virtual conference environment according to some embodiments. FIG. 7 shows communication interfaces that apply to both the conferencing and exploration options. User terminal components 736 are shown towards the bottom of FIG. 7, while server components 734 are shown at the top of FIG. 7.

User Terminal Components

For some embodiments, user terminal components 736 include a capture setup 732, reconstruction and perspective processor 730, positioning and tracking component 720, interaction device 726, interaction and application controller 724, (local) panorama renderer 718, AV coder 728 and AV decoder 716, and (terminal) display 722. A capture setup 732 calibrates sensors of the capture setup during installation and by users request and performs real-time wide base 3D capture of the local space, e.g., each sensor produces a depth and texture map of a sub-view.

For some embodiments, a reconstruction and perspective processor 730 combines received calibrated sets of depth and texture into a 3D reconstruction of the local space in real world scale, specifies an origin for the local space either by a rule or by user interaction, specifies an orientation for the local space either by a rule (e.g., compass North) or by user interaction, and sets the local coordinate system using the derived/given origin and orientation, and the real-world scale. To support visualizing a local user 764 in other spaces (enabling users' virtual visitations in other spaces), virtual perspective videos are produced from the eye-point of each user in the virtual geometry towards the position of the local user 764 in the unified geometry, so that the video is cropped to contain only the local user. The background around the local user may be removed and made transparent. Also, video may be produced for 360° (full panorama) around each remote users eye-point in the local space. For some embodiments, a local background of a perspective video of a user may be replaced with another background. The updated perspective video may be displayed for some embodiments. For some embodiments, a background may be updated based on the location of a user within a local space. For some embodiments, a perspective video may be a panoramic video, such as, for example, a video with a wide-angle or 360-degree view.

For some embodiments, a positioning and tracking component 720 positions and tracks users in a local space with respect to local and/or unified geometry or coordinate system using wearable or external components (e.g., by a positioning system of AR/VR glasses). An interaction and application controller 724 enables use of system functionalities by a user pointing, selecting, gesturing, and controlling manual inputs 760. An interaction and application controller 724 also connects with a terminal display 722 and may contain user application logic and software, e.g., functions which may be triggered by a user's proximity. Proximity may also be a vector value, sensitive to orientations/directions in the geometry. For some embodiments, manual inputs 760 and gestures 762 may be received by an interaction device 726. The interaction device 726 may generate actions and data 754 that are inputs to an interaction application controller 724. The interaction application controller 724 may generate data (which may include icons and menus) 752 that are inputs to a terminal display 722. For some embodiments, the interaction application controller 724 may communicate interaction data 742 with a communication bus. For some embodiments, inputs may be received from a user for moving an environment. For some embodiments, an input may be received from a user for modifying a location and/or orientation of a local environment scan. For some embodiments, the mapping of the local environment scan to a location and orientation in a shared virtual geometry may be adjusted based on such inputs from a user (inputs may include manual inputs, voice commands, gestures, postures, and body motions and may be assisted by a map of the shared virtual geometry and user positions).

For some embodiments, a (local) panorama renderer 718 may perform different renderings based on what a user desires. If a user wants to see other users in his or her own environment, a local panorama renderer 718 may receive perspective videos of each remote user from the local user's eye-point and augment perspective views into a 360° panorama for the users own local environment (without receiving panorama video from a server). If a user wants to see other users in a remote environment, a local panorama renderer 718 may receive a chosen 360° remote panorama with remote users augmented by a server. For both sight options, a local panorama renderer 718 renders, to the user's AR/VR glasses 722, a sub-view 750 for a received or locally-processed 360° panorama 740, corresponding to the user's position and viewing direction 748 in the unified virtual geometry 744.

For some embodiments, an AV coder 716 codes outgoing perspective components, while an AV decoder decodes incoming perspective or 360° panorama video (as well as spatial audio). A display (which may be AR/VR glasses) 722 displays spatially-oriented viewpoints to a chosen space with other users and displays menus and data 752 for user interaction and application control. For some embodiments, sensor data 758 may be communicated from a terminal display 722 to a position and tracking component 720.

Server Components

For some embodiments, server components may comprise a server database 702, a user and session manager 704, a connection and data manager 706, a mobility and geometry manager 708, a panorama and visitation manager 710, a bit rate reduction manger 712, an external interface manager 714, and a connecting bus that connects to one or more managers. A user and session manager 704 may manage users and sites logging in/out of the system. One site may be occupied by one or more users. A site with its users may participate with a conferencing and/or exploration option.

For some embodiments, a connection and data manager 706 forms connections and dispatches data between users, uses knowledge of the chosen service or session, and may use proximity/distance of other users if forming connections and dispatching data (e.g., favoring interactions with virtually nearby users to reduce bitrate and computations).

For some embodiments, a mobility and geometry manager 708 may form and maintain a unified coordinate system (or unified virtual geometry 744) for conferencing and exploration and support a user in finding and occupying a position for his or her domicile (position of the meeting space in the unified coordinate system) in exploration mode.

A mobility and geometry manager 708 may form and maintain a unified coordinate system (or unified virtual geometry 744) for a varying number of parallel conferences according to data from a user and session manager 704 and a panorama and visitation manager 710. The mobility and geometry manager 708 may align sites participating in a conferencing session into a virtual meeting setup (such as, for example, by overlaying sub-space origins and orienting (or rotating) spaces by a rule or according to user selection). As a result, spatially-faithful conferencing is enabled via a unified coordinate system between participating sites and their occupants.

The mobility and geometry manager 708 may form and maintain a unified coordinate system (or unified virtual geometry 744) for exploration according to data from a user and session manager 704 and a panorama and visitation manager 710. The mobility and geometry manager 708 may align captured user spaces into a spatially-faithful virtual landscape (or union of sub-spaces aligned in a grid) for social interaction. As a result, a unified coordinate system (or unified virtual geometry 744) over a dynamic, virtual landscape of sub-spaces (sites) may be created, enabling spatially-faithful viewpoints between sites and their occupants.

The mobility and geometry manager 708 may support a users exploration of a virtual landscape to find and occupy a position for his or her domicile (e.g., by showing a map of the virtual landscape). The mobility and geometry manager 708 may show information on the holders of occupied positions (including directories and search tools). The mobility and geometry manager 708 may support mobility and positioning of user spaces, including moving and orienting a user space (or dwelling) into a new position (or domicile).

For some embodiments, a panorama and visitation manager 710 may form, for each user, spatially faithful panoramas of all spaces using their positions in the unified virtual geometry 744. For a conferencing option, a panorama and visitation manager 710 may form, for each captured space, a set of individual 360° panorama views from positions corresponding to each participant's position (or local position data 738) in the unified virtual geometry 744. For an exploration option, a panorama and visitation manager 710 may form limited field of view (FoV) panoramas of captured spaces as seen from outside. For both conferencing and exploration options, a panorama and visitation manager forms panorama views for GPS or otherwise tracked users outside of visually-captured spaces. For the user's choice of site to be visited, a panorama and visitation manager 710 compiles perspective views from the user towards other users with a selected panorama (a view of the users own environment or a remote environment) used for the background. Additional options for a background panorama may include virtual models or virtual world landscapes (e.g., accessed via an external interface manager 714).

For some embodiments, a bit rate reduction manager 712 may reduce and/or compress data streams. Such data reduction and compression may be performed by encoding and decoding AV data to/from user terminals (e.g., compiled user panoramas 740, backgrounds and user perspectives 746, and spatial audio), transmitting perspective videos instead of higher bitrate 3D data 756, reducing resolution of coded/transmitted/rendered data components as a function of a users proximity or distance from connected node/participants (e.g., a level of detail may be decreased for distant objects), and pruning incoming connections (and data received) from other participants outside of the current participant's field of view based on his or her facial orientation. For some embodiments, audio/video (AV) data may be decoded, augmented with additional content related to a user, and re-encoded. Such re-encoded AV data may be transmitted to a server.

For some embodiments, an external interface manager 714 connects a system to external data and services (including virtual models or virtual world environments to be used with conferencing or exploration options).

Conferencing

Some embodiments of systems and methods disclosed herein include two functional modes of operation: conferencing and exploration. The properties and use of these modes may differ depending on the way separate geometries are combined into a unified, spatially faithful geometry.

For conferencing mode, users are able to conference between a group of users (group conferencing). For some embodiments of conferencing, separately-captured user spaces and their occupants are unified into a co-centric virtual geometry. In a co-centric geometry, all unified user spaces overlap in at least one point of the virtual geometry. Appearing in their virtual spatial positions, users are able to virtually visit and directionally view (up to 360°) participating sites. Conferencing supports a virtual cocktail party-type of interaction over network. Unlike people in a real-life cocktail party, participants are brought virtually to a space, as illustrated in FIG. 8.

Figure 8:
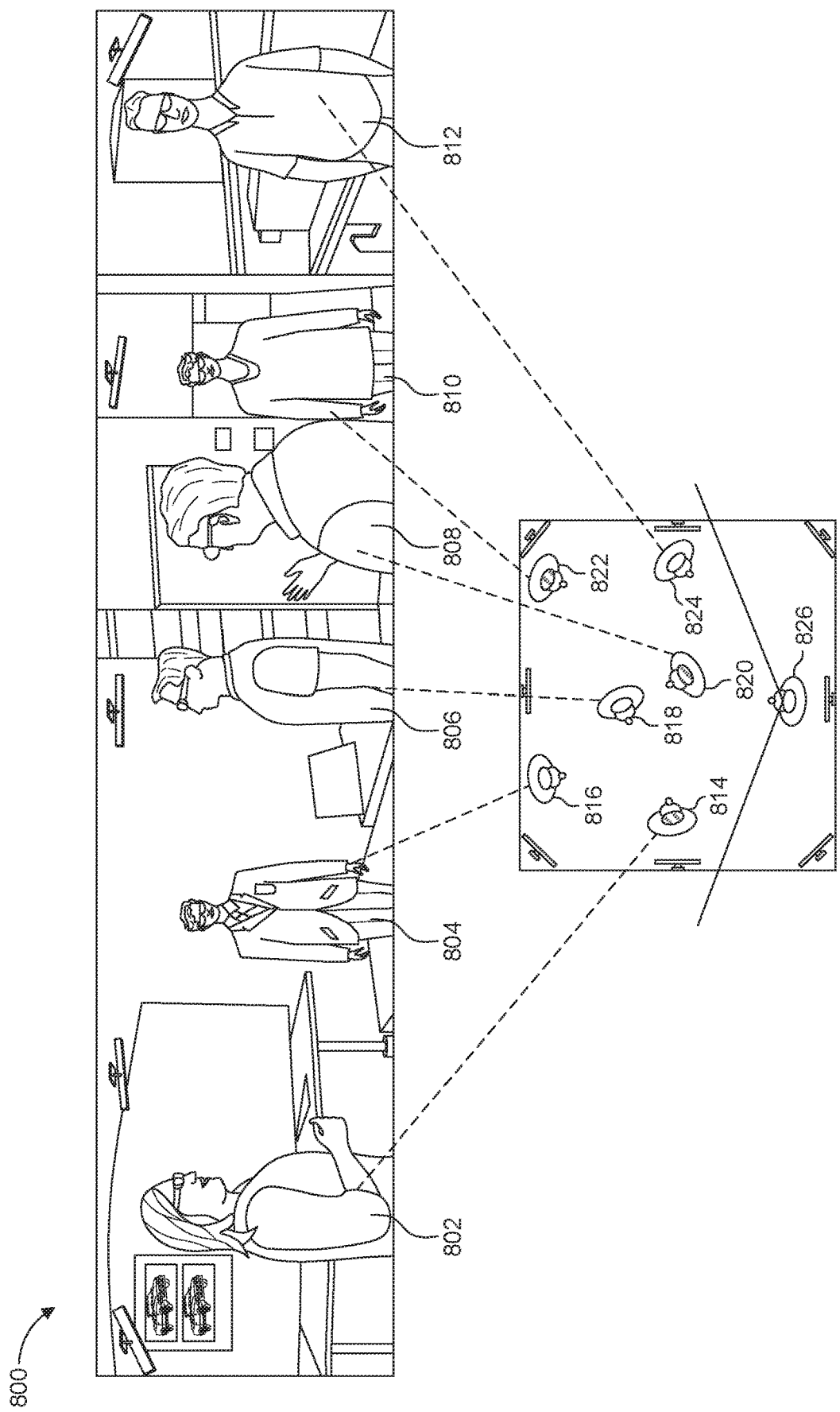
FIG. 8 is a schematic illustration of an example set of six remote participants rendered into a room from the viewpoint of a participant according to some embodiments.

FIG. 8 is a schematic illustration of an example set of six remote participants rendered into a room from the viewpoint of a participant according to some embodiments. FIG. 8 shows an example of seven users virtually gathering in a conference room or office 800. Remote participants 802, 804, 806, 808, 810, 812 shown at the top of FIG. 8 are rendered into a local space shown by the map as users 814, 816, 818, 820, 822, 824 at the bottom of FIG. 8. Six of the users 802, 804, 806, 808, 810, 812 are shown at the top of the figure from the perspective of the seventh user 826.

Figure 9:
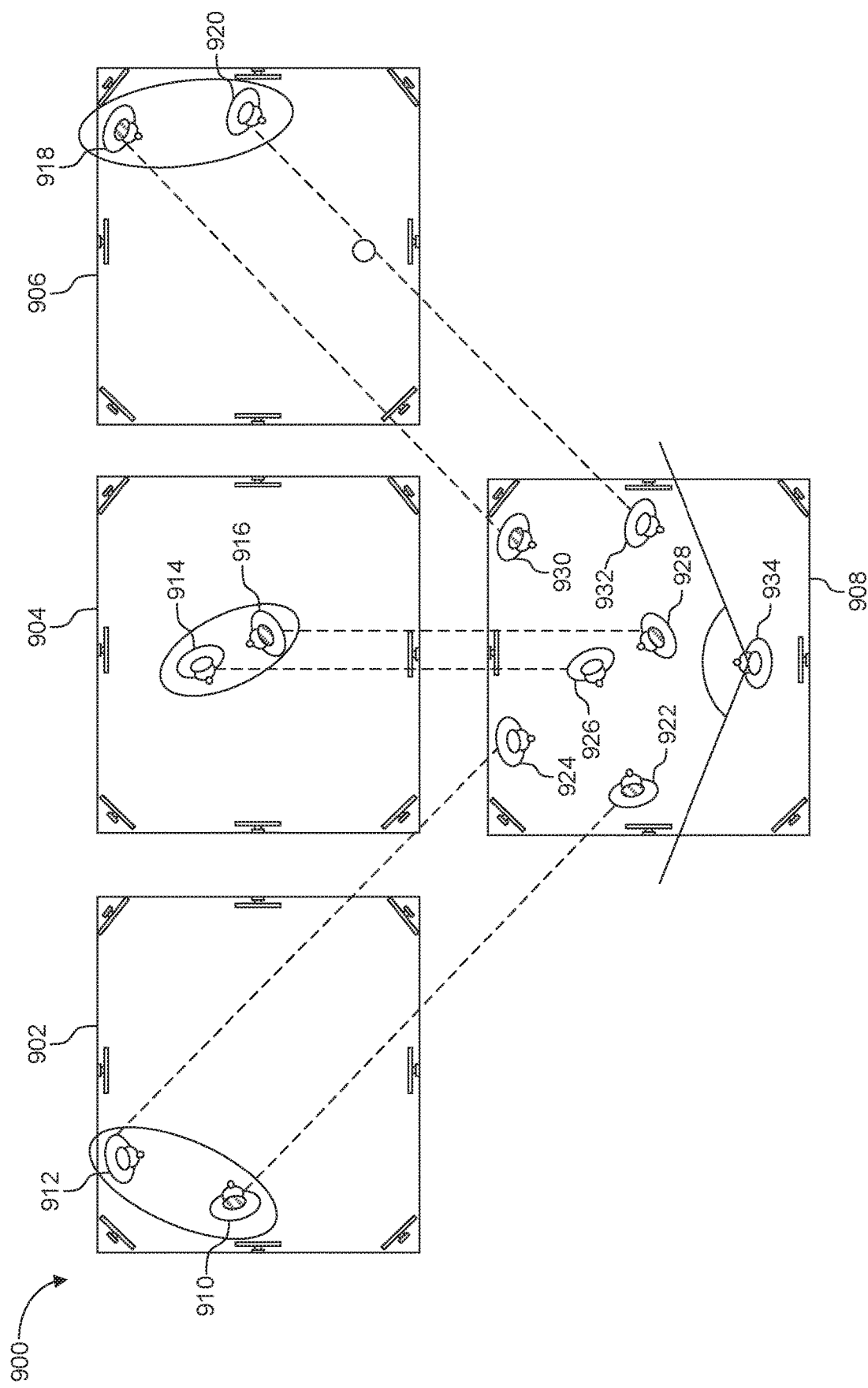
FIG. 9 is a schematic plan view illustrating an example set of remote participants rendered into a unified geometry according to some embodiments.

FIG. 9 is a schematic plan view 900 illustrating an example set of remote participants rendered into a unified geometry according to some embodiments. FIG. 9 shows an example of three local sites combined to form a unified geometry 908. Users' positions in each local space 902, 904, 906 may be captured by electronic means. Spatially faithful (or correct) perspective views of remote participants 910, 912, 914, 916, 918, 920, separated from their real backgrounds, may be formed and transmitted to each local participant, and positioned according to a unified geometry 908. Correct user-centric views may be displayed by AR/VR glasses at the eye-point of each user.

For some embodiments, to compile all participants into one space, each separate meeting space 902, 904, 906 is 3D-captured and reconstructed with a set of sensors. FIG. 9 shows three remote meeting rooms 902, 904, 906, with their six participants 910, 912, 914, 916, 918, 920, composed into a local participant's space 908 (shown at the bottom of FIG. 9) as the participants 922, 924, 926, 928, 930, 932 from the perspective of the local participant 934. To simplify FIG. 9, room layouts, orientations, and user positions are shown to be equal for all spaces. For some embodiments, a two-dimensional perspective video may be created that combines a background image with a perspective video of one or more remote users from the perspective of a local user. Such a combined video may be transmitted to another user or a server for some embodiments.

In reality, meeting spaces have different shapes and sizes, and if they are compiled into a unified geometry, their orientations and overlaps are adjusted (which may be done to improve visibility between participants). Also, users are able to "visit" participating sites. For some embodiments, the background around a local user may be removed and made transparent. The background may be replaced with the background of another user's site, thereby enabling a user to "visit" another users site.

In addition to their own local space, users are able to choose to see each other in the spatial orientation of any of the remote spaces. Hence, users may replace the local background with a background from a remote space. By not showing remote spaces at the same time, a system mitigates the non-conformance problem mentioned earlier of merging heterogeneous spaces, their furniture, and fixtures into one space. Users may find it more natural to see real environments intact without seeing them artificially merged.

Exploration

Exploration mode supports meeting space mobility. For exploration mode, user spaces and their occupants are unified into different points on a 2D plane (or grid), thus forming an expandable landscape, which enables interactions with close neighbors (users in neighboring locations). This structure enables a new type of social networking by allowing users to modify their location in the landscape and thus, also distances to other users. Exploration supports spatially faithful interaction of a large group of users in a 3D landscape. Differing from virtual worlds, which may support spatially faithful environments for a large number of users, the disclosed system supports interactions in a landscape of photorealistic 3D captures of user environments.

Figure 10A:
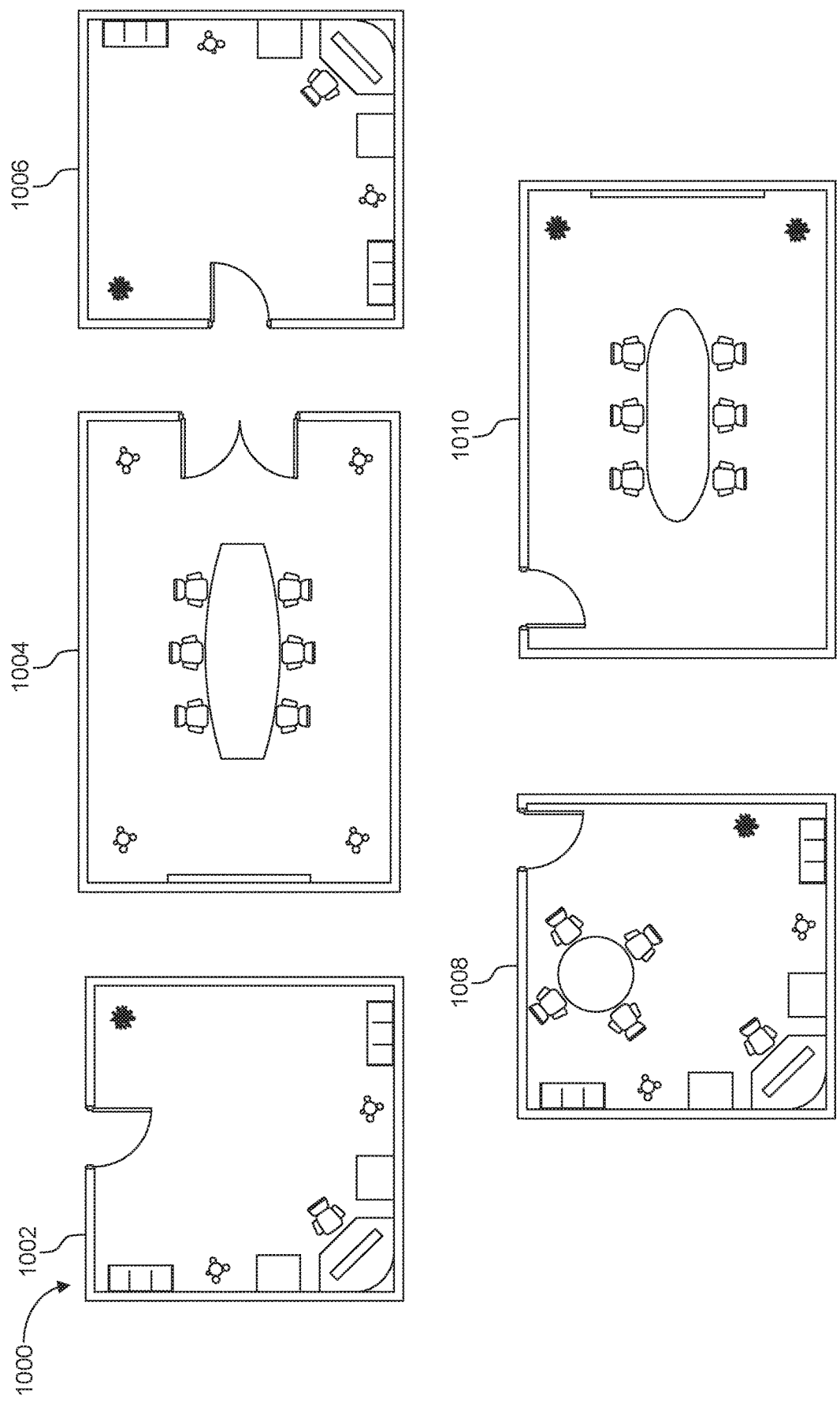
FIG. 10A is a schematic plan view illustrating an example set of captured user spaces prior to removal of obstructing walls according to some embodiments.
Figure 10B:
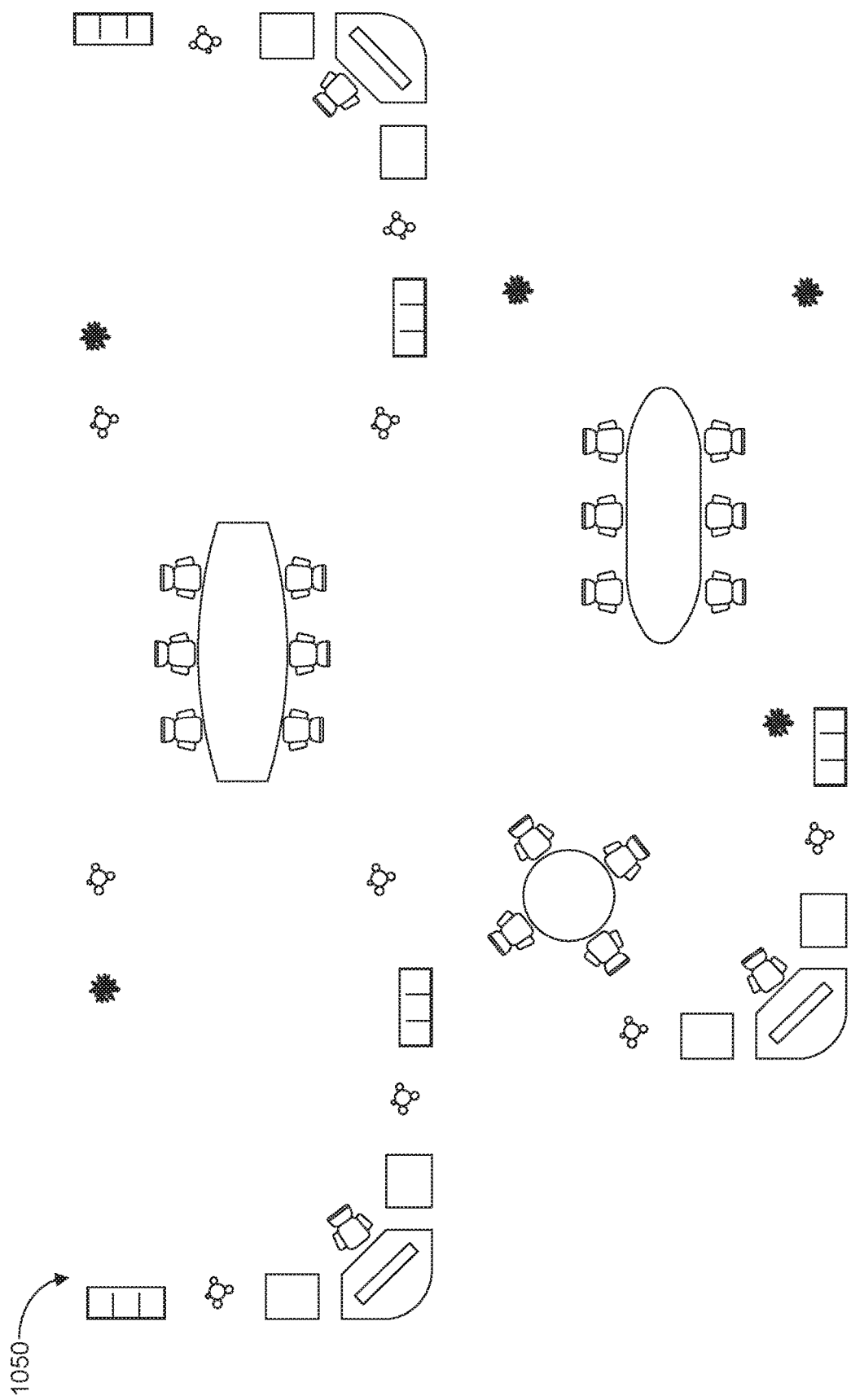
FIG. 10B is a schematic plan view illustrating an example set of captured user spaces after removal of obstructing walls according to some embodiments.

FIGS. 10A and 10B show some embodiments to illustrate exploration space. FIG. 10A is a schematic plan view illustrating an example set of captured user spaces prior to removal of obstructing walls according to some embodiments. A landscape is shown as separate 2D user spaces positioned on a 2D plane or as "patches in a quilt." FIG. 10A shows an example virtual landscape 1000 of five user spaces 1002, 1004, 1006, 1008, 1010 prior to removal of walls. FIG. 10B is a schematic plan view illustrating an example set of captured user spaces after removal of obstructing walls according to some embodiments. FIG. 10B shows a virtual landscape 1050 for those five user spaces with walls removed. By keeping captured spaces separate, FIG. 10B depicts a system which avoids overlapping and merging user spaces. FIG. 10B shows an example set of office and conference room user spaces.

Forming Unified Virtual Geometries

One differentiating factor for unified virtual geometries may be whether alignment of separately captured spaces and their occupants is co-centric or grid-based. Co-centric geometry means that the origins of the sub-spaces are aligned on one point on a 3D surface, or a 2D plane for some embodiments. A grid-based geometry may be formed by aligning the origins of sub-spaces into different (2D) grid points. For some embodiments, grid points may be at equal intervals, but for other embodiments, grid points may be displaced at irregular intervals. For both conferencing and exploration, multiple captured meeting spaces are combined into a union of geometries with an origin for each captured space set to a position in the unified geometry (or union of geometries).

Setting and Aligning Origins

If aligning captured sub-spaces into either a co-centric or grid-based geometry, a reference point (or origin) is set for each sub-space in order to position and orient them with respect to each other. Manual definition is an option, but for an example embodiment, a system sets sub-space origins with a deterministic algorithm.

For some embodiments, an origin of a captured sub-space is set based on the geometric center of each captured area (or floor layout). For another embodiment, an origin is set based on a perpendicular projection, on the floor, of the geometric center of the captured 3D volume.

For conferencing, a co-centric geometry may be used for alignment. Separate geometries may be translated, rotated, and unified for every telepresence session. Unification may be made by aligning the origins of separate geometries into one global origin. The size of the unified geometry (union of combined rotated geometries) may be limited by the maximum dimensions of separate geometries.

For exploration, a grid-based geometry may be used for alignment. Separate geometries may be rotated to match with a global cardinal direction (e.g., map north). Separate geometries may be unified into one dynamic virtual geometry by aligning their origins into different 2D points, forming a grid with equal or unequal grid point intervals (for separate embodiments). The location of a separate geometry in a unified geometry may be changed by moving its origin to a different 2D point.

Applying a Co-Centric Geometry for Conferencing

Some embodiments of conferencing with a co-centric geometry support spatially faithful conferencing between a finite number of users. A conference may be set up by a system using an address book or shared meeting links. Some conferencing embodiments provide for a spatially faithful interaction in a unified geometry, which is formed as a co-centric union of multiple captured meeting spaces. As the collaborating people and the setup of conferences vary (even during sessions), the process of forming a unified geometry is dynamic and may occur repeatedly during use.

A co-centric union of sub-spaces may be formed by setting an origin for each captured room space and overlapping the spaces by aligning their origins on the same 2D coordinates. The spaces are rotated around the origin to adjust the relative positions of users for a spatially oriented telepresence session, where the users are distributed approximately evenly and have visibility of each other. Various algorithms and rules may be used for setting sub-space origins and for setting conditions for spatial distribution rotations. Geometrical relationships of participants with the furniture and fixtures of each room may be optimized.

Example Configuration for Conferencing

Figure 11:
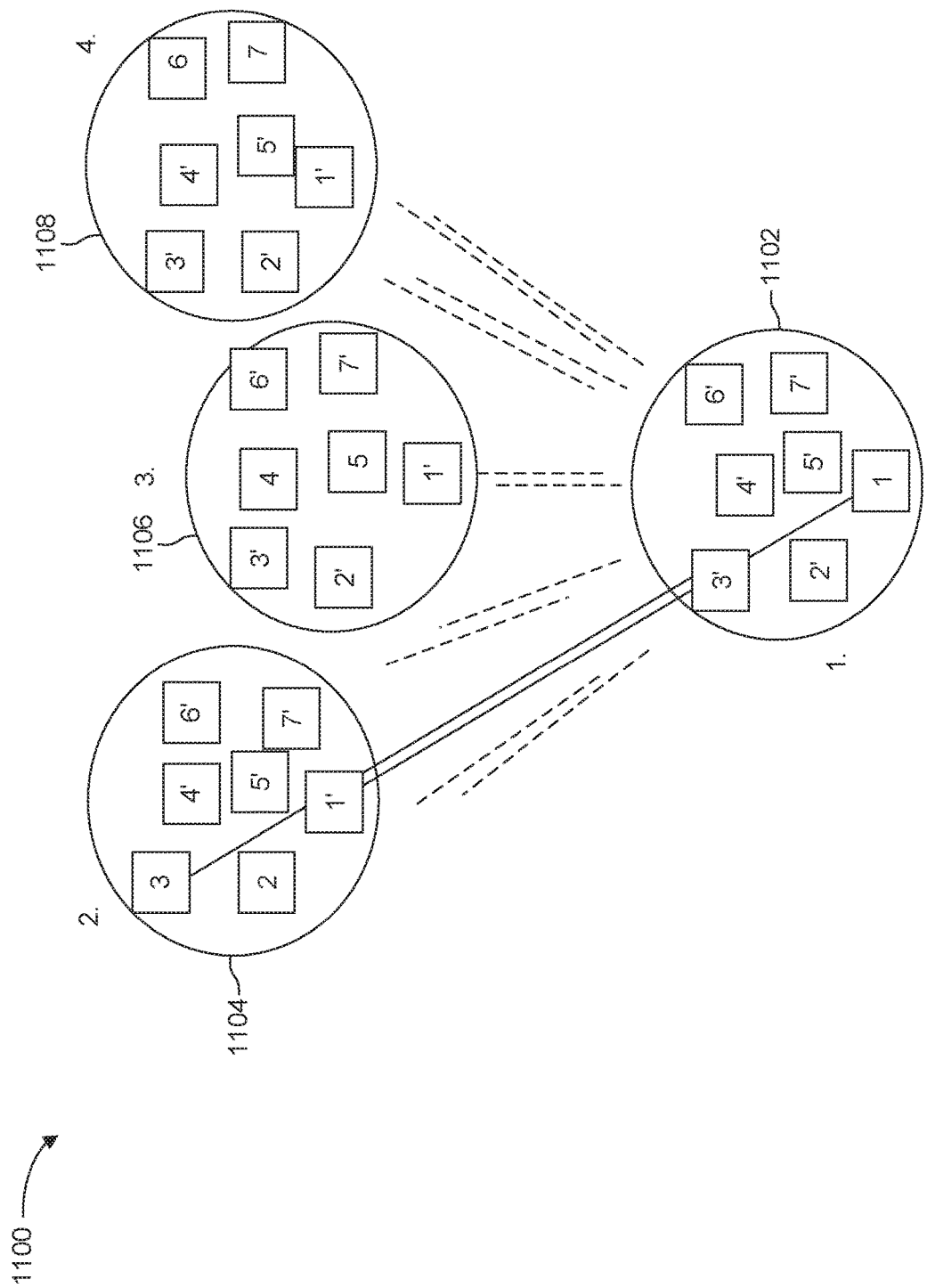
FIG. 11 is a schematic plan view illustrating an example set of geometries and connections from a users viewpoint in a telepresence system for seven participants at four sites according to some embodiments.

FIG. 11 is a schematic plan view illustrating an example set of geometries and connections from a users viewpoint in a telepresence system 1100 for seven participants at four sites according to some embodiments. For some embodiments, the same virtual unified geometry is used by all meeting sites. FIG. 11 illustrates an example for connecting capture setups 1102, 1104, 1106, 1108 in a seven-party meeting from a local user's (no. 1) viewpoint. The meeting setup shown in FIG. 8 also correlates to the example shown in FIG. 11. Meeting sites with a varying number of local users in each are shown as circles. Physical local persons and (the images of) remote participants are shown in each of the circles.

For some embodiments, each remote user is captured by a virtual camera (using the formed 3D reconstruction) and displayed to local users (by showing views 2' through 7' on his or her AR glasses). The background may be a local users environment or another environment chosen by the local user. For FIG. 11, a number in a box without an apostrophe indicates a user is local to that meeting site. A number in a box with an apostrophe indicates an image of that user is used at that meeting site. The large circles in FIG. 11 indicate a physical view of a meeting site. The long lines connecting two squares in FIG. 11 are examples of connections between virtual cameras and displays (for users 1 and 3 for the example connections shown in FIG. 11), although, for example, any server-based or peer-to-peer delivery may be used.

Virtual Visitation Functionality in Conferencing

Supporting virtual visitations is a feature in conferencing that enables users to see remote participants in a spatially oriented way either in one's own environment, or in any of the remote environments. The functionality enables visiting any of the remote participants (seeing them in their real physical context (refer to those "hosting" the visit/space)).

Figure 12:
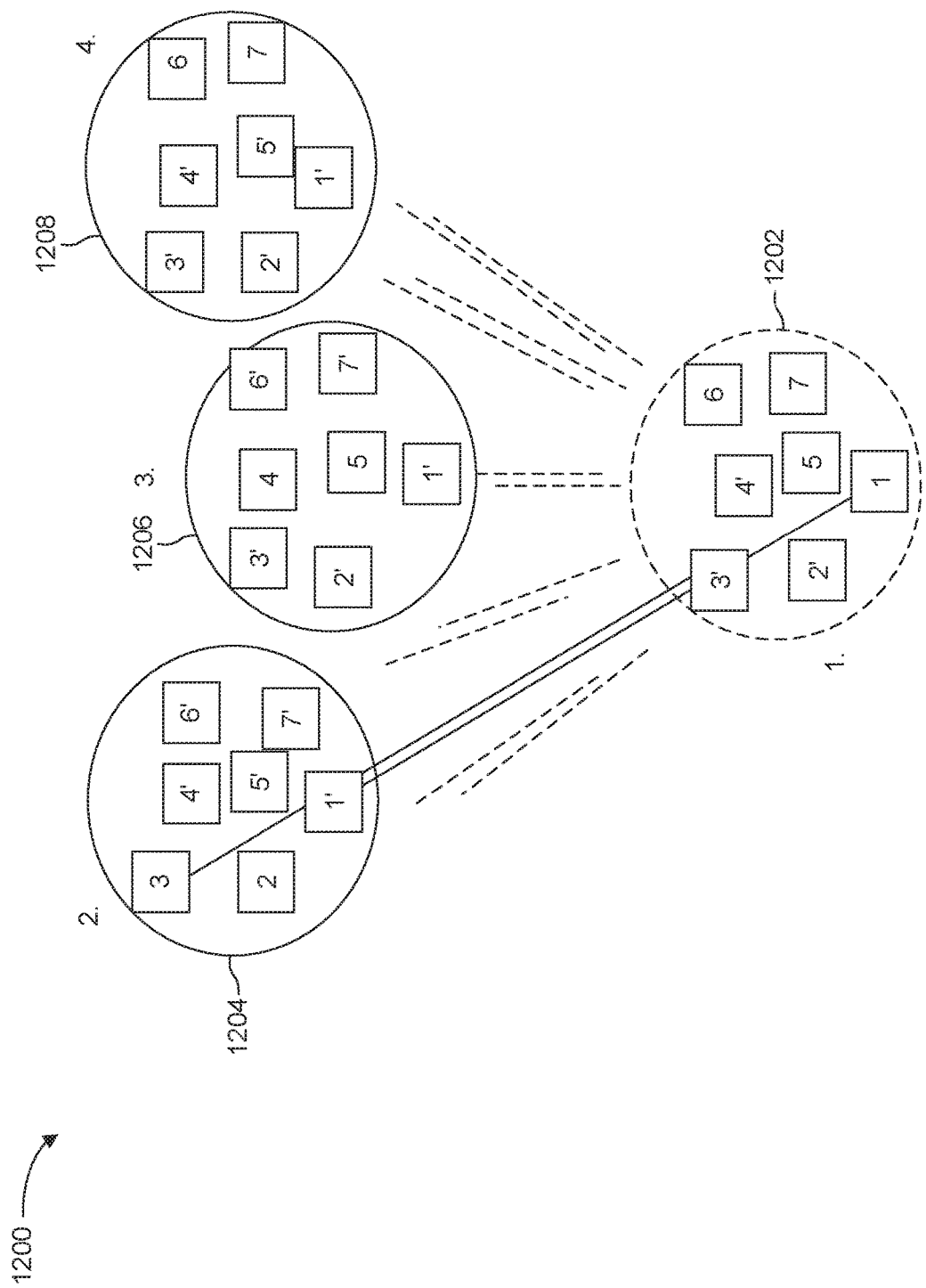
FIG. 12 is a schematic plan view illustrating an example set of geometries and connections from a users viewpoint for a user visiting another user in a telepresence system for seven participants at four sites according to some embodiments.

FIG. 12 is a schematic plan view illustrating an example set of geometries and connections from a users viewpoint for a user visiting another user in a telepresence system for seven participants at three sites according to some embodiments. FIG. 12 shows a local user replacing his or her environment 1202 with a panorama captured by a virtual 360° camera in a remote space 1208 (for users 6 and 7 in this example). A virtual panorama may be formed with a 360° projection from a chosen 3D reconstruction (site) into a chosen users eye-point (such as a visiting user's virtual position). The part of the panorama which is shown fits to a users facial orientation and the field of view of his AR/VR glasses. FIG. 12 shows user 1 visiting (selecting the background of) site number 4 in an example telepresence system 1200 for seven participants at four sites 1202, 1204, 1206, 1208.

For FIG. 12, a number in a box without an apostrophe indicates a user is local to that meeting site. A number in a box with an apostrophe indicates an image of that user is used at that meeting site. The large circles with solid lines indicate a physical view of a meeting site. The dashed circle depicts the panorama captured from a remote space. The remote users (numbers 6 and 7 in this example) are shown as part of the environment. The fact that local user number 1 visits site number 4 (1208) (or sees local users at site 4 in their real context/environment) is emphasized by denoting users numbers 6 and 7 without the apostrophe in the local space number 1 (1202). The long lines connecting two squares in FIG. 12 are examples of connections between virtual cameras and displays (for users 1 and 3 for the example connections shown in FIG. 12), although, for example, any server-based or peer-to-peer delivery may be used.

Example for Forming a Co-Centric Geometry

Figure 13:
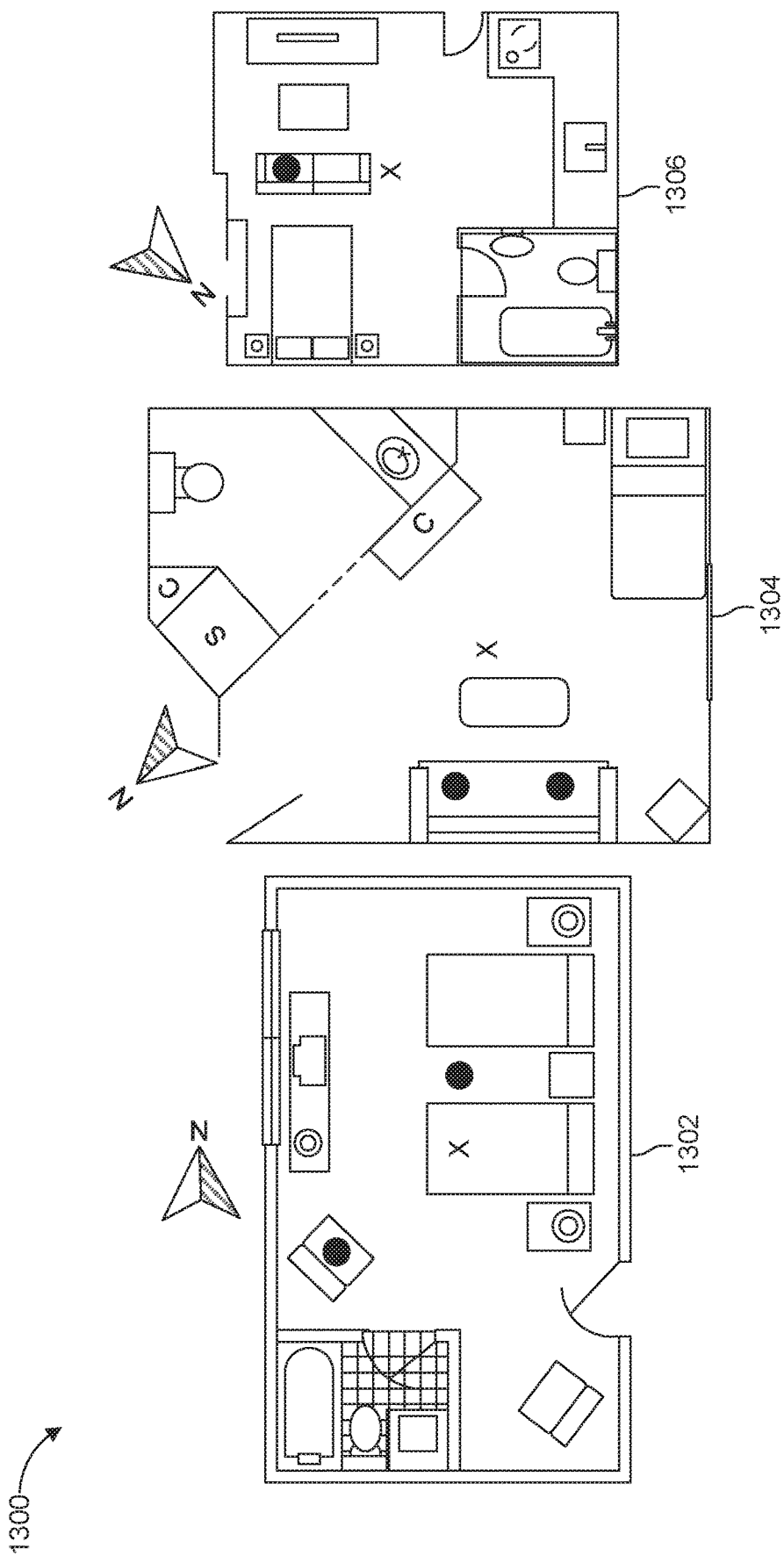
FIG. 13 is a schematic plan view illustrating an example set of three meeting sites with five users using a spatially faithful conference configuration and a co-centric geometry according to some embodiments.

FIG. 13 is a schematic plan view illustrating an example set of three meeting sites 1302, 1304, 1306 with five users using a spatially faithful conference configuration and a co-centric geometry according to some embodiments. A set of user spaces (or room interiors) 1300 are determined with zero or more users in each space. Zero users indicates a scenario where a user participating in a conference has left the conference, which may be temporary. This scenario is described below. For some embodiments, the rooms (possibly excluding the bathrooms or other private areas) may be captured locally and reconstructed by 3D sensors. The origin of each captured space 1302, 1304, 1306 may be shown by an "x". Users, who may be sitting on seats, are marked as solid black circles. Each captured space 1302, 1304, 1306 also may show the cardinal direction of the room. Cardinal directions shown by map north in FIG. 13 may not necessarily be real compass directions. Cardinal directions may be set by the system or users so that combining the spaces results with a good visibility between participants.

Figure 14:
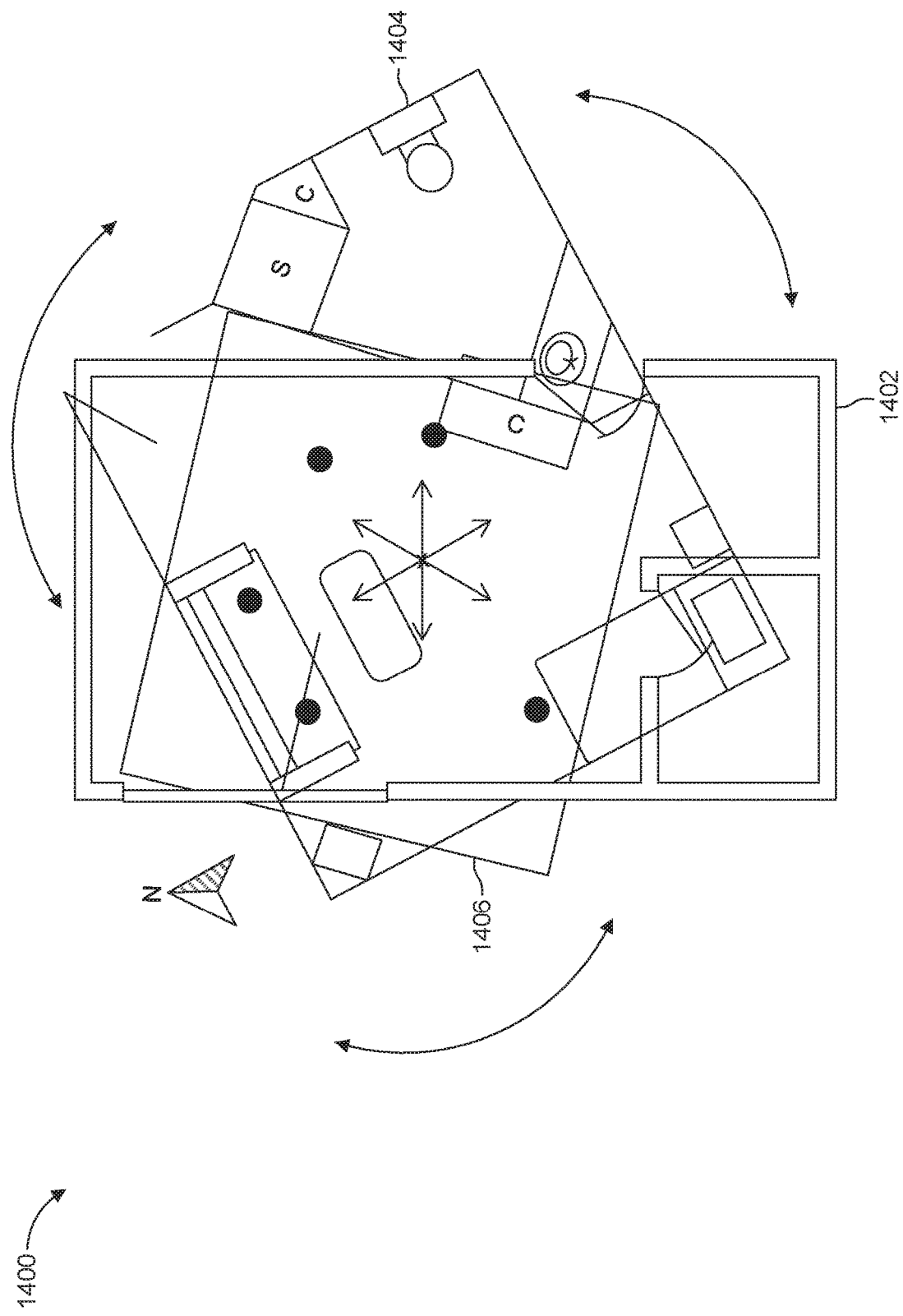
FIG. 14 is a schematic plan view illustrating an example set of three meeting spaces aligned by their origins and cardinal directions according to some embodiments.

FIG. 14 is a schematic plan view illustrating an example set of three meeting spaces aligned by their origins and cardinal directions according to some embodiments. FIG. 14 shows a combined geometry 1400 of the meeting spaces 1402, 1404, 1406 shown in FIG. 13. Separate meeting spaces (or geometries) may be aligned by their origins and rotated to align their cardinal directions. Arrows indicate translations and rotations during alignment.

With an aligned and rotated set of meeting spaces, spatially faithful conferencing (or interaction) may occur between participants. Each participant may see other participants from his or her viewpoint inside his or her own meeting space or may make a "visit" to a remote environment by replacing a local background with a background from a remote site for visualizing on an AR/VR display.

For some embodiments, if combining local geometries, a user may fall outside one or more of the other captured (or remote) spaces. A user falling outside a remote space may have a viewing angle of less than 360° for that space. Further, to see that space for some embodiments, the nearest wall may be removed from an AR/VR display. The user may not, in a natural way, see the texture of that wall (although, those users inside the space may see and discuss that wall's texture). The described phenomenon is emphasized for those users who are moving outside their local spaces.

If a restricted view disturbs a user, he or she may be guided to move so close to the other users that the viewpoint falls inside the viewed (or visited) sub-space. Alternatively, the user may be satisfied and may be guided to see remote participants rendered in some of the larger spaces without the described problem.

Example Configuration for Exploration

One example embodiment for exploration supports visibility, navigation, and spatially faithful interaction between a large number of users. See FIG. 10B for an illustration of an example setup, where five user setups are combined in a virtual landscape. Separate user spaces are brought into a semi-permanent landscape. This landscape lets users learn the location of captured meeting spaces of their friends, contacts, and other people. Several embodiments may be used to support searching and finding desired contacts, directories, maps, profiles, and recommendations.

Exploration may be used for social connectivity in a virtual 2D landscape, and, for some embodiments, support users and user spaces to navigate together and move around with respect to the unified geometry. In addition, exploration may enable a user to move a captured personal space to a new location in a virtual landscape.

Like in the physical world, compass directions may be used in the virtual landscape. Real cardinal north may be used as a cardinal direction for each of the captured spaces. If not detectable, a user may set cardinal north manually.

In an example embodiment, user sub-spaces (their origins) are aligned to different points on a 2D plane. Local spaces are oriented (or rotated) according to a global map, where north is set for the virtual 2D plane and the local spaces. Local spaces may form neighborhoods and other communal structures. By supporting users' preferences when forming this structure, social networking and other services may be supported in a way feeling natural to users.

Example for Forming a Grid-Based Geometry

Exploration is another service supported by a system. For exploration, a user locates his or her captured local space into a unified 2D geometry and sees those friends, acquaintances, or unknown people who have positioned their captured spaces nearby. A user may move around in respect to his or her captured space and see other users in spatially faithful orientations due to each user being tracked with respect to his or her own space as part of the unified geometry.

For example, five users may be spread over three room layouts, as shown in FIG. 13. For a unified geometry, cardinal directions may be used for alignment. Instead of aligning the origins of sub-spaces at one common 2D point, they are aligned into separate 2D grid points. Each sub-space may be additionally aligned with global north by rotating them around each local origin.

Figure 15:
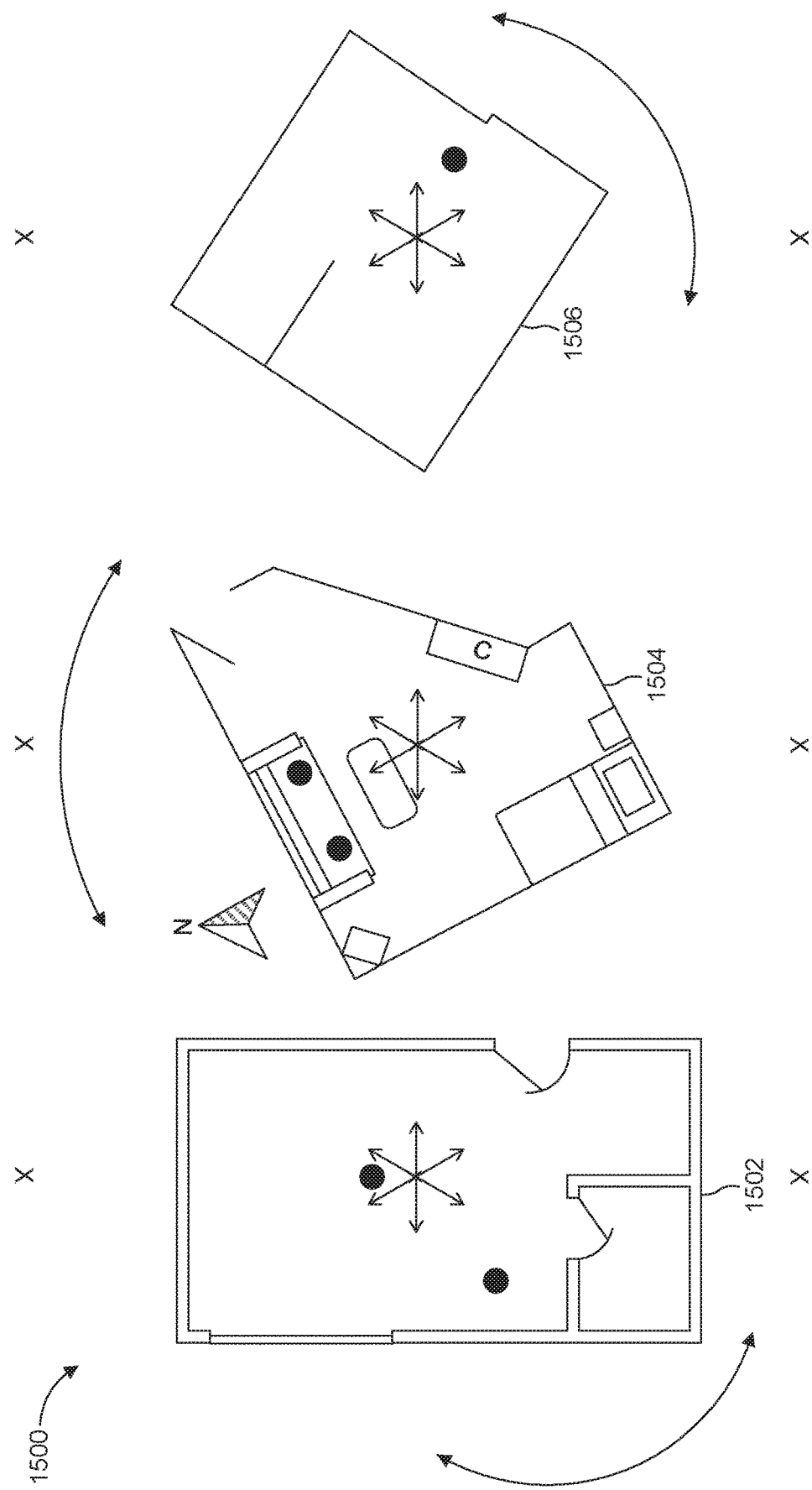
FIG. 15 is a schematic plan view illustrating an example for forming a unified geometry by aligning sub-spaces into separate grid points and matching their cardinal directions according to some embodiments.

FIG. 15 is a schematic plan view illustrating an example for forming a unified geometry by aligning sub-spaces into separate grid points and matching their cardinal directions according to some embodiments. FIG. 15 shows an example environment 1500 of three spaces 1502, 1504, 1506 aligned with a global north. In this example, grid points are at equal intervals, but for other embodiments, grid points may be displaced at irregular intervals. FIG. 15 also illustrates the option of spaces being moved or turned by a user. The above unification process may result in a semi-permanent, but dynamic geography, which users may find easy to navigate, memorize their own and their friends' locations, and decide whether to change their current location.

In an example process, forming a visually and functionally consistent geometry, as illustrated in FIGS. 10A and 10B, separates subspaces far enough to avoid overlap (such as, for example, by forming into a grid of points with a displacement greater than the maximum supported diameter for a 3D captured sub-space).

The captured sub-spaces of FIG. 10B may be dimensionally-restricted to avoid overlap for visual rendering. For example, a divider between sub-spaces may be drawn such that the line is equally far from any two participants. This principle may result in a Voronoi tessellation, where each participant is the centroid of his or her own file. This operation also cuts out the walls between user spaces and makes a virtual geometry a continuous volume (similar to FIG. 10B or a furniture store with groups of interiors).

Another method for avoiding continuity issues may combine segmented users into captured and tracked positions in a continuous virtual world or 3D landscape, instead of a compilation of physical views that may have discontinuities. As a result, user spaces may not be photorealistic.

Meeting Space Mobility Functionality in Exploration

Meeting space mobility is supported for exploration, where 3D captured sub-spaces form a 3D landscape in which a system may allow a user to move his or her own space from place to place (similar to turning and moving of sub-spaces, as illustrated in FIG. 15). Virtual structures may be added to turn a landscape into more of a mixed reality space. In particular, a virtual base structure (such as a terrain or floor) may be added to fill gaps in between separate sub-spaces. Added virtual elements may include municipal structures and roads, and a system may support respective restrictions and rules for meeting space mobility and relocation.

Like moving in the real world, moving a meeting space may be a more permanent action than just walking around a room. Moving a meeting space enables building semi-permanent structures and social relations by users and choosing default locations relating the captured whereabouts of their friends and contacts (similar to changing one's domicile in the real world). Both combining a large number of variable sized room interiors into landscapes and supporting meeting space mobility within a landscape may use clear and concise policies to support good, continuous visibility between users.

Forming Connections Between Users

For some embodiments, connections are formed between each and every user in a spatially faithful geometry. For some embodiments, individual viewpoints (or perspective videos) are formed and transmitted between each and every participant. Conferencing and exploration options may be used for both embodiments because neither embodiment depends on whether a 2D geometry is co-centric or grid-based; in both cases, users have their individual, dynamic 2D positions in the unified geometry.

However, as exploration may be used for interactions of many users in a large expandable geometry, there may be a practical maximum distance (radius) around each participant, after which those users further away are not connected or shown (similar to situations in the real world). In addition to reducing number of connections, this practical maximum distance may be used to reduce communication bitrates.

Figure 16:
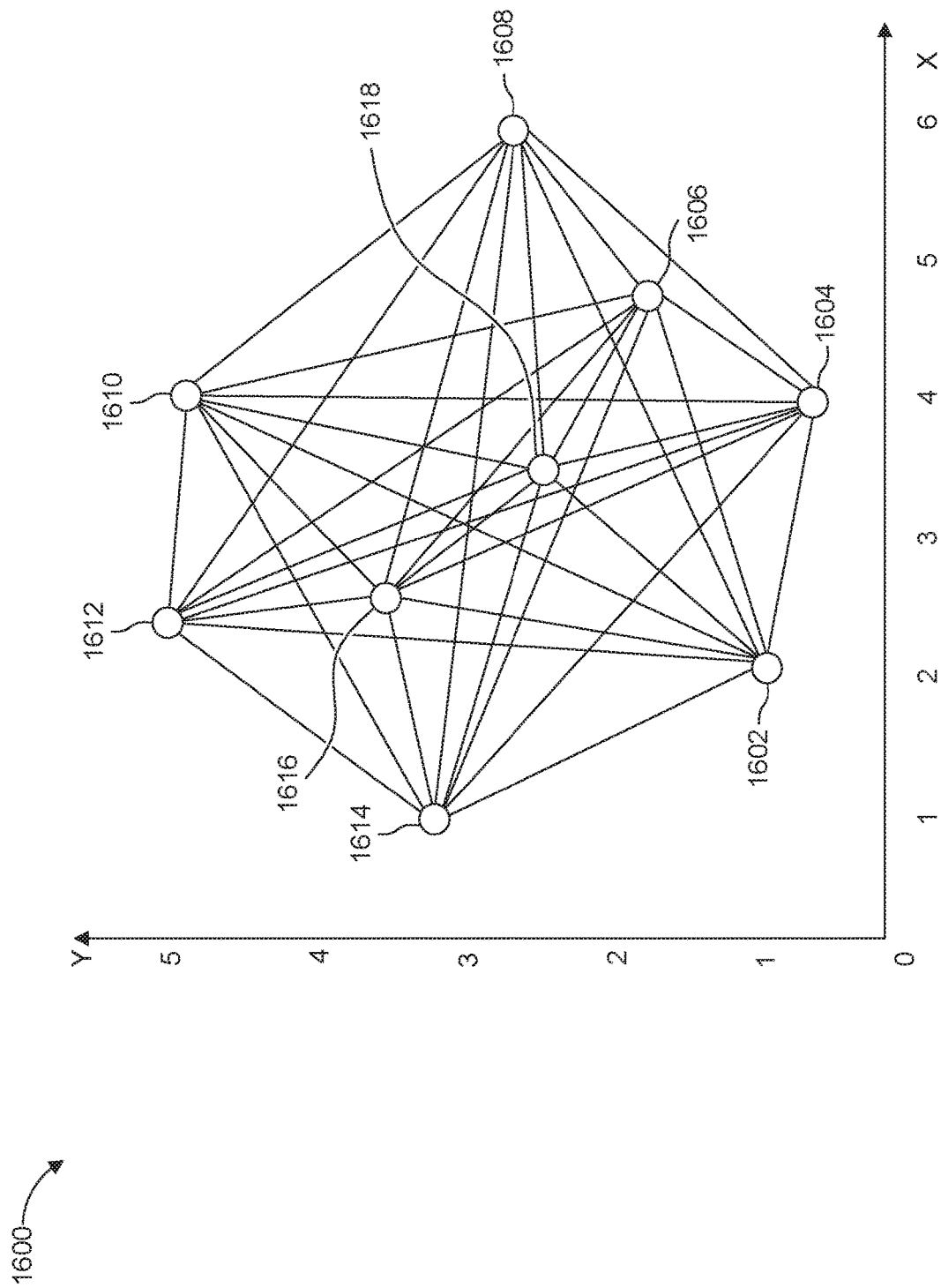
FIG. 16 is a schematic plan view illustrating an example set of connections and viewpoints for nine freely positioned participants according to some embodiments.

FIG. 16 is a schematic plan view illustrating an example set of connections and viewpoints for nine freely positioned participants according to some embodiments. FIG. 16 shows an example environment 1600 of each user 1602, 1604, 1606, 1608, 1610, 1612, 1614 1616, 1618 connected to the other users (similar to an airline connection map). The number of two-way connections N between n nodes follows Metcalfe's law, as shown in Eq. 1:

$$N = \frac{n(n-1)}{2} \quad \text{Eq. 1}$$

For the example shown in FIG. 16, $$N = \frac{9(9-1)}{2} = 36.$$

With all participants positioned in a unified coordinate system (similar to FIG. 16), their viewpoints, viewing angles, and distances may be derived using trigonometry. These parameters and a user's viewing direction (which may be obtained by sensors embedded in AR/VR glasses) may be used when forming, compiling, transmitting and rendering individual views for each participant. The illustration in FIG. 16 may be used for both co-centric and grid-based geometries, whether or not some of the users share the same space. For some embodiments, users have unique positions and viewpoints in the unified geometry, assigned and tracked for each local space.

Extending User Mobility

Systems and methods disclosed herein extend user mobility in comparison with previous systems and methods. In addition to users' ability to move around, some embodiments of a system supports an ability to move and orient renderings of locally-captured spaces with respect to other participants. User mobility is extended to enable users to leave their captured sub-spaces. Supporting user mobility avoids confining a user to a fixed position and facial orientation during interactions. A more challenging target is to support a user moving also outside the captured area, and even outdoors.

In some systems disclosed herein, support for mobility is based on tracking users in their captured environments. As wearable AR/VR glasses may be used as a display in systems disclosed herein, tracking may include detection of users' viewpoint orientations. Sensors embedded or connected to AR/VR glasses may perform this tracking. A tracking system may be calibrated for each 3D capture system and for a unified virtual geometry.

Tracking may occur outside a captured space, for example, if a user temporarily leaves a captured room to visit his or her kitchen or mailbox outside. If a user goes outside, tracking, for example, by GPS, enables a user to continue his or her collaboration session, which may have reduced modalities.

Supporting virtual mobility means that a user's physical position, motions, and turns determine his or her virtual position and orientation inside some remote spaces. A user is provided with a correct spatially oriented viewpoint of remote users and spaces. When a user's eye-point is inside a remote space, he or she may be classified as virtually visiting that space. In systems and methods disclosed herein, virtual visitation is supported by providing users virtual 360° panorama views.

In some embodiments for conferencing and exploration, a user may see a captured remote space from outside the space. For some embodiments, walls and vertical objects blocking views to and from captured spaces are not shown on AR/VR displays to enable a user to see views not available in actual user spaces. For some embodiments, such blocking objects may be generated in transparent mode. For some embodiments, a perspective video of a local space may be generated or updated without the blocking objects that may obstruct a view of a user within the local space.

Managing Bitrates

Based on Metcalfe's law mentioned earlier, the number of connections between n participants increases close to the order of $n^2$. With increasing n, without efficient measures, both the number of connections and the number of transferred bits may use a lot of resources.

Several actions may be performed to reduce network load, such as reducing resolution as a function of proximity/distance from a remote node in a shared virtual geometry, reducing incoming connections and data received, and reducing/compressing data streams in algorithmic ways. Spatial 2D resolution may be reduced approximately proportionally to the inverse of the squared distance (without angular resolution or perceived accuracy being changed). Users located beyond a practical maximum distance (or radius) may not be shown or connected to a local user. Reduction of incoming connections and data received may be reduced from the backside of a participant based on captured facial orientations (similar to a user not using visual information from directions he or she is not observing). One example for reducing or compressing data streams is by sending perspective videos instead of 3D data (depth plus texture).

Managing the connections and viewpoints of a large number of users in dynamic spatially faithful geometries may use one of several data structures and algorithms. For example, known graph theory algorithms may be used.

Supporting Spatial Audio

Spatially faithful geometries may also support spatial audio. Producing a spatial audio field for each user position may be made with a multi-channel speaker system. If users are wearing AR/VR glasses, both speech and ambient audio may be recorded in high quality with microphones combined or embedded with glasses. Some embodiments may use external, directional microphones for audio capture.

A user augmented to a virtual position also may be heard from that direction. If users focus on some of the remote participants, they may focus on respective audio sources. A system may detect user focus from a users facial direction, and use the detected user focus for controlling other video and/or audio sources. This method may be used, for example, to support two party side talks during group conversations. Audio volume also may be controlled as a function of proximity/distance in a shared virtual geometry from a remote participant.

Transmitting Perspective Videos On-Demand

In one example embodiment, spatially oriented views from remote participants are transmitted as perspective videos. Because perspective videos are requested on-demand from a specified position, position information is sent to the transmitting side. Transmitting perspective videos on-demand lowers bitrates but sets latency requirements. Requirements for two-way transmission and processing delays may also set requirements for network transmission and perspective capture processes. Two-way transmission and processing delays slow down system reactions to users' viewpoint changes (similar to moving his or her camera at each far end), but these delays may not cause delays in received or transmitted videos. Hence, there may be momentary degradation in spatial faithfulness but not in an actual conversation. User movements may be moderate in a teleconferencing situation, so that distortions may also be small.

For good quality conferencing, most delays may be caused by voice and video processing. For systems disclosed herein, a round-trip delay may comprise sending user position data to a remote end (uplink), changing viewpoint for the perspective video, and streaming the video (and audio) downlink. For systems disclosed herein, due to the relatively small amount of position data sent uplink, uplink delay contributes less to round-trip delay than in the above referred more symmetrical case.

The above described delays in interaction may not occur for many teleconferencing systems, if the received content (viewpoint) is not changed according to user motions. Round-trip delays may become larger in telepresence systems supporting interactions between receiver and transmitter, e.g., for individual viewpoints and eye-contact.

Similar to other video applications, a 2D or stereoscopic 3D (sc. S3D) display may be used for showing on-demand perspectives. Compared to previous systems based on 3D transmission, bitrates may be reduced by using 2D or S3D videos if user positions are available at each moment. If a position changes, new 2D video or S3D information may be sent.

System Processes and Functionalities

Some methods and systems disclosed herein support multiple users per site, multiple user positions (although some user positions may be better than others for spatially oriented telepresence and interaction), user mobility outside a captured area, virtual mobility of captured local spaces, a large number of users, and asymmetric and symmetric applications.

Some systems and methods disclosed herein for spatially faithful telepresence support flexible, system or user adjustable geometrical relations between multiple meeting sites, with multiple mobile participants, addressing both group conferencing with virtual visitations to any of the participating sites (called conferencing herein), and social interactions between a large number of users, based on meeting space mobility inside a dynamic, unified spatial geometry (called exploration herein).

In some embodiments of systems and methods disclosed herein, one or more users occupy their local spaces (private or office rooms) in various geographical locations. The spaces are captured in real time by multiple 3D sensors along the room walls or inside the spaces, so that a high-quality reconstruction may be formed from each of the user spaces by the system. In addition, user positions may be specifically assigned and tracked by electronic and/or image processing means.

The system forms a unified virtual geometry, which brings local spaces with their occupants into geometrical orientations relating each other. Users may be wearing AR/VR glasses, which enable them to see other persons (those in the room and at remote sites) rendered around them in a spatially faithful way according to formed geometries.

During conferencing, users are able to move with respect to their locally-captured spaces aligned in a co-centric unified geometry, where a co-centric geometry is one example option for a unified coordinate system. During exploration, the system or users are able to move locally-captured spaces in a grid-based unified geometry formed by aligning or moving sub-spaces into various grid positions in a unified coordinate system.

A user may move independently of his or her local space, which may be moved in a virtual geometry/landscape formed from all other user spaces. Systems and methods disclosed herein extend mobility and enable functionalities. In particular, supporting mobility of meeting spaces enables building up and managing unified virtual landscapes, which enable proximity-based interaction functionalities for a large number of users. Proximity may refer to a distance between users and/or a distance between captured spaces in the virtual geometry, which both may trigger interactions. Proximity, as a vector value, may enable both distance- and direction-based interactions.

Figure 17:
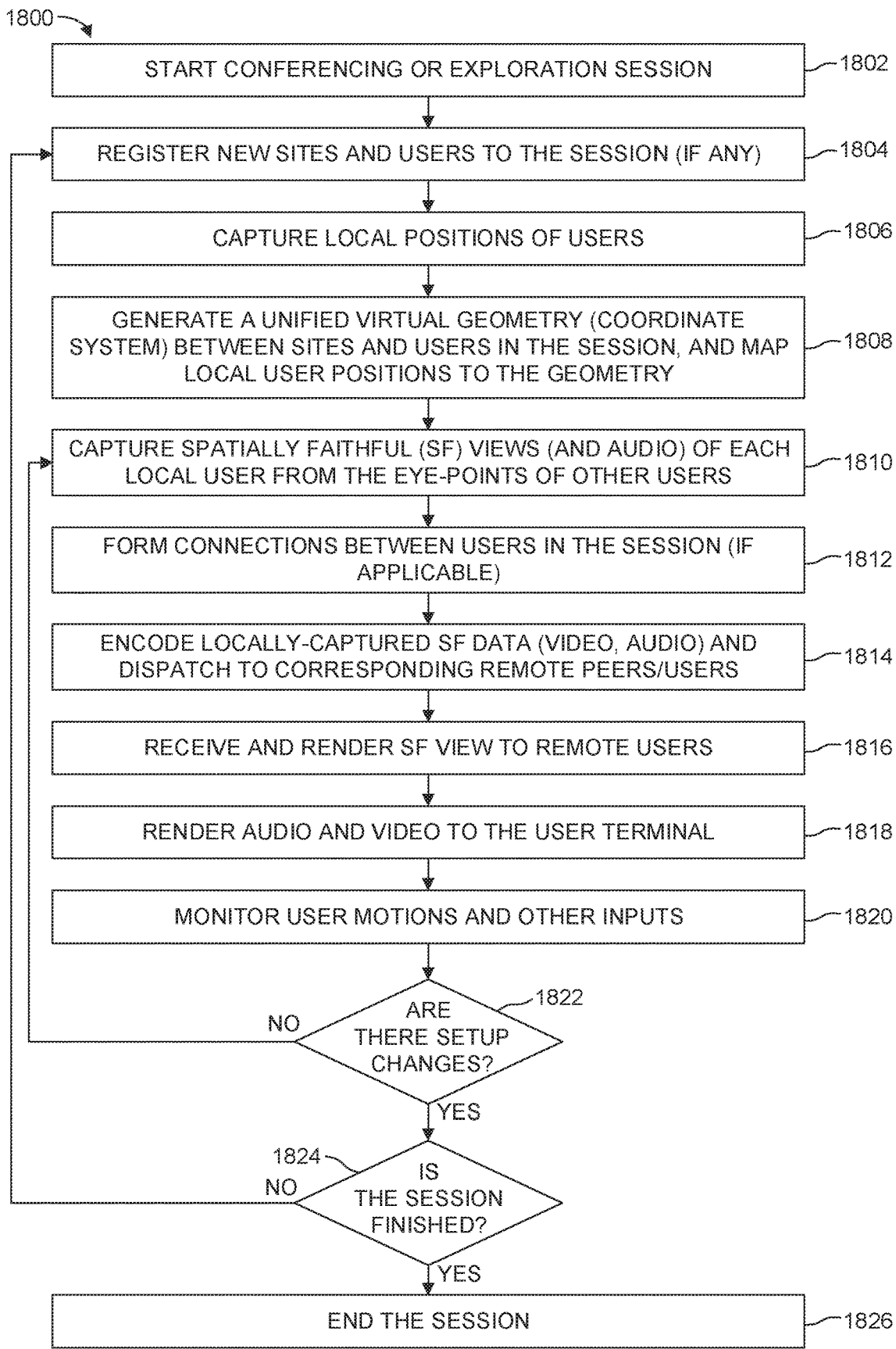
FIG. 17 is a flowchart illustrating an example process for using a tessellated space for both conferencing and exploration according to some embodiments.

FIG. 17 is a flowchart illustrating an example process for using a tessellated space for both conferencing and exploration according to some embodiments. To simplify FIG. 17, the flowchart 1800 does not indicate how operations are split between user terminals and server. A conferencing or exploration session is started 1802, and new sites and users may be registered 1804 to the session. Local user positions may be captured 1806. A unified geometry between sites and users in a session may be generated 1808, and local user positions may be mapped to the geometry. Spatially faithful (SF) views (and audio) of each user may be captured 1810 from the eye-points of other users. Connections between users in the session may be formed 1812. Locally-captured SF data (such as video and audio) may be encoded 1814 and sent to corresponding remote peers and users. SF views may be received and rendered 1816 to remote users. Audio and video may be rendered 1818 to a user's terminal, and user motions and other inputs may be monitored 1820. If a decision process 1822 determines there are not setup changes, some embodiments return to re-capture 1810 spatially faithful views (and audio) of each local user from the eye-points of other users and continue to repeat the process. If there are setup changes and a decision process 1824 determines that the session is not finished, some embodiments register 1804 new sites and users and continues. If the session is finished, the session ends 1826.

Conferencing Flowchart

Figure 18A:
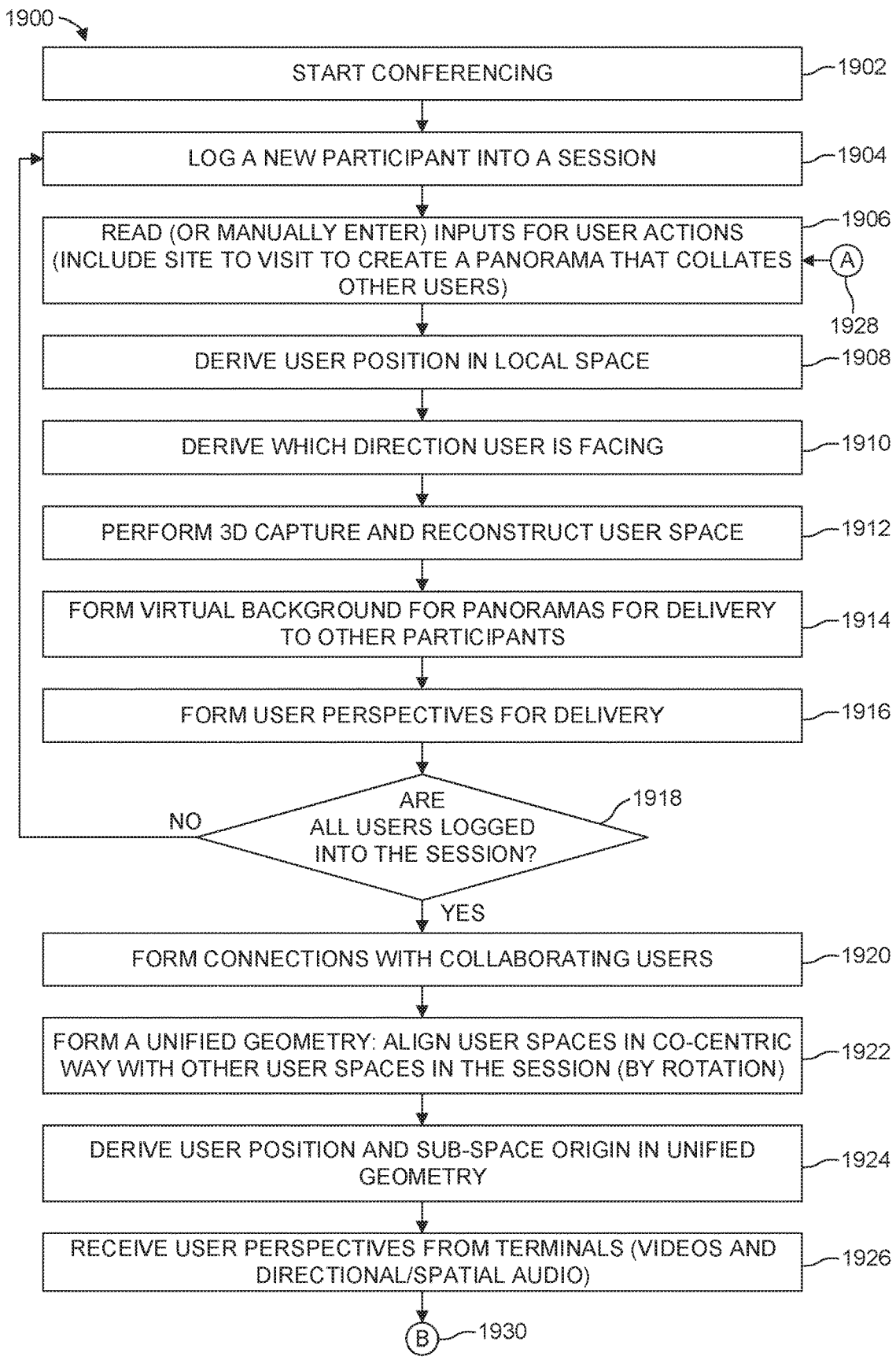
FIGS. 18A and 18B are a set of flowcharts illustrating an example process for a user interfacing with a virtual tessellated space for conferencing in a unified configuration according to some embodiments.
Figure 18B:
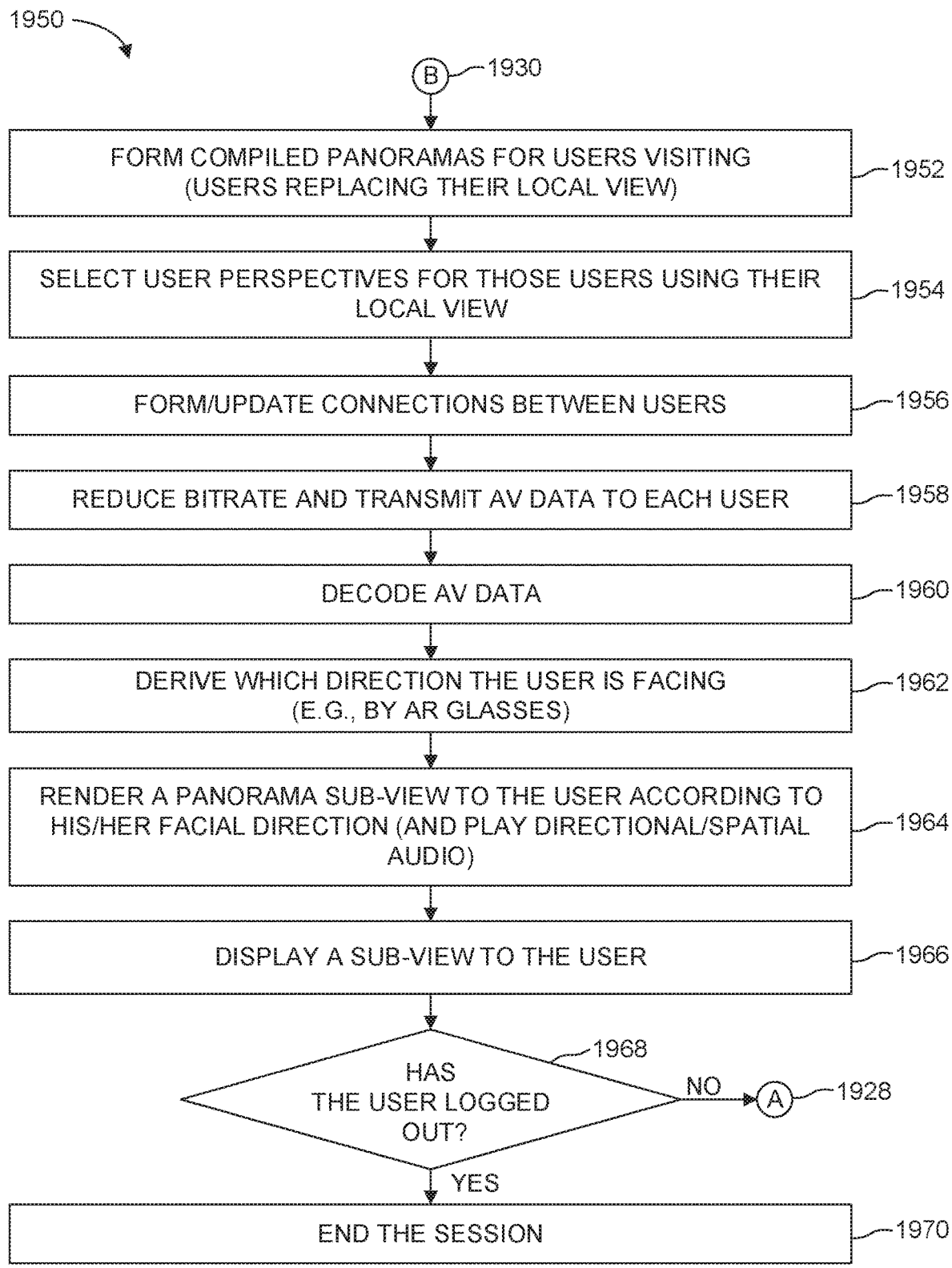

FIGS. 18A and 18B are a set of flowcharts illustrating an example process 1900 for a user interfacing with a virtual tessellated space for conferencing in a unified configuration according to some embodiments. A new participant (or user) may start conferencing 1892 and may log 1904 into a session. Inputs may be read 1906 (or manually entered) for user actions (including site to visit, supported by creating a panorama that collates other users). A users position in a local space and facing direction may be derived 1908, 1910. A 3D capture and reconstruction of a user space may be performed 1912. A virtual background for panoramas may be formed 1914 for delivery to other participants. User perspectives may be formed 1916 for delivery. If a decision process 1918 determines not all users are logged into the session, some embodiments may log 1904 a new user to the session. Otherwise, connections may be formed 1920 with collaborating users. A unified geometry may be formed 1922 by aligning user spaces in a co-centric way with other user spaces in the session (by rotation). A user's position and sub-space origin may be derived 1924 in the unified geometry. User perspectives may be received 1926 from terminals (videos and directional/spatial audio). Connector B 1930 connects FIG. 18A's flowchart 1900 and FIG. 18B's flowchart 1950. Compiled panoramas may be formed 1952 for visiting users (or users replacing their local view) that show a remote user space from an angle corresponding to a local users position and viewpoint. User perspectives may be selected 1954 for those users using their local view. Connections between users may be formed and updated 1956. Bitrates may be reduced, and AV data may be transmitted 1958 to each user. AV data may be decoded 1960 and the users facing direction may be derived 1962 (e.g., by AR glasses). A panorama sub-view to the user may be rendered 1964 according to his or her facial direction, and directional/spatial audio may be played. A sub-view may be displayed 1966 to the user. If a decision process 1968 determines that the user has logged out, the session may end 1970. Otherwise, some embodiments return via Connector A 1928 to read 1906 inputs for user actions.

Exploration Flowchart

Figure 19A:
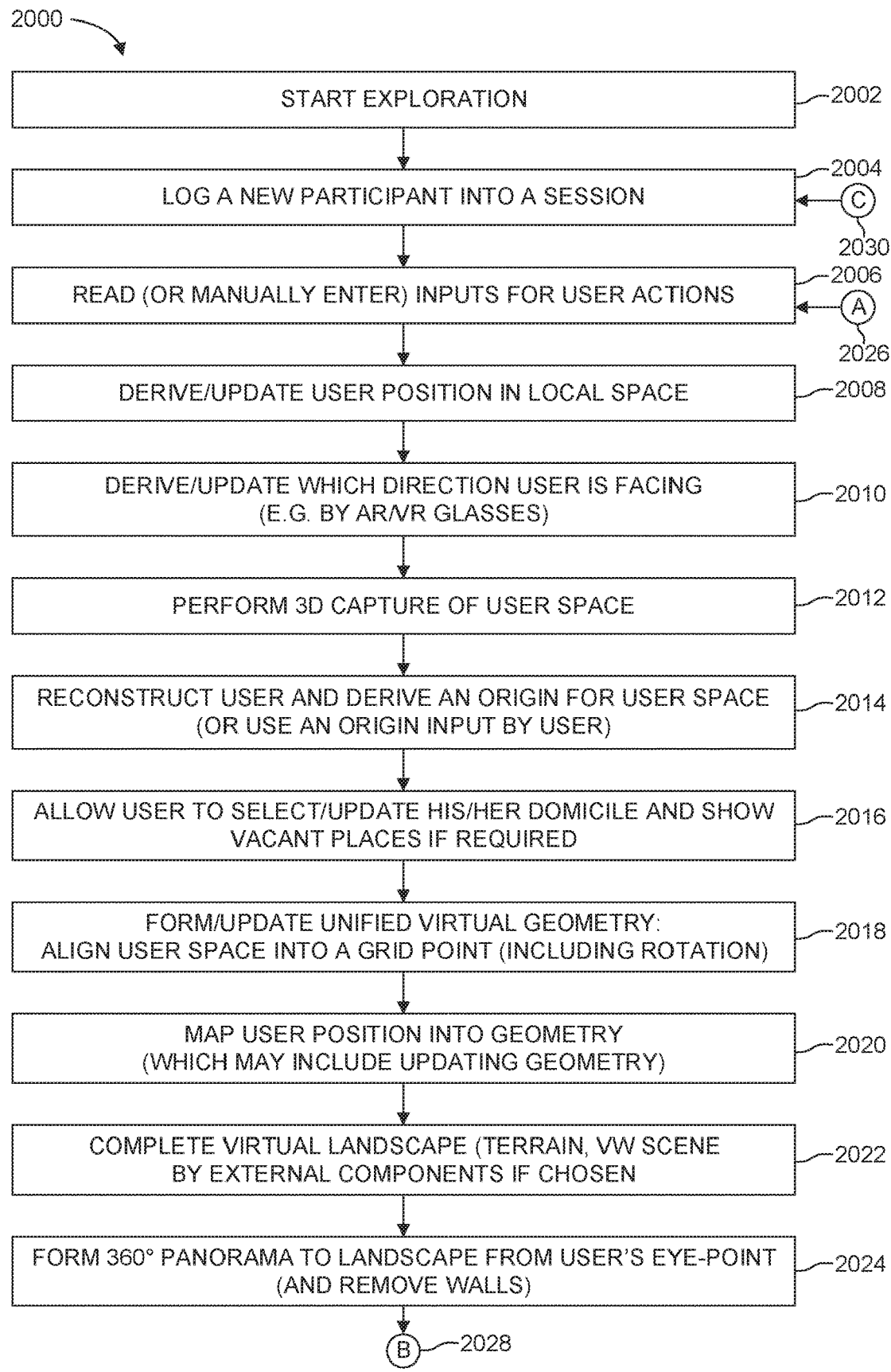
FIGS. 19A and 19B are a set of flowcharts illustrating an example process for a user interfacing with a virtual tessellated space for exploring a unified configuration according to some embodiments.
Figure 19B:
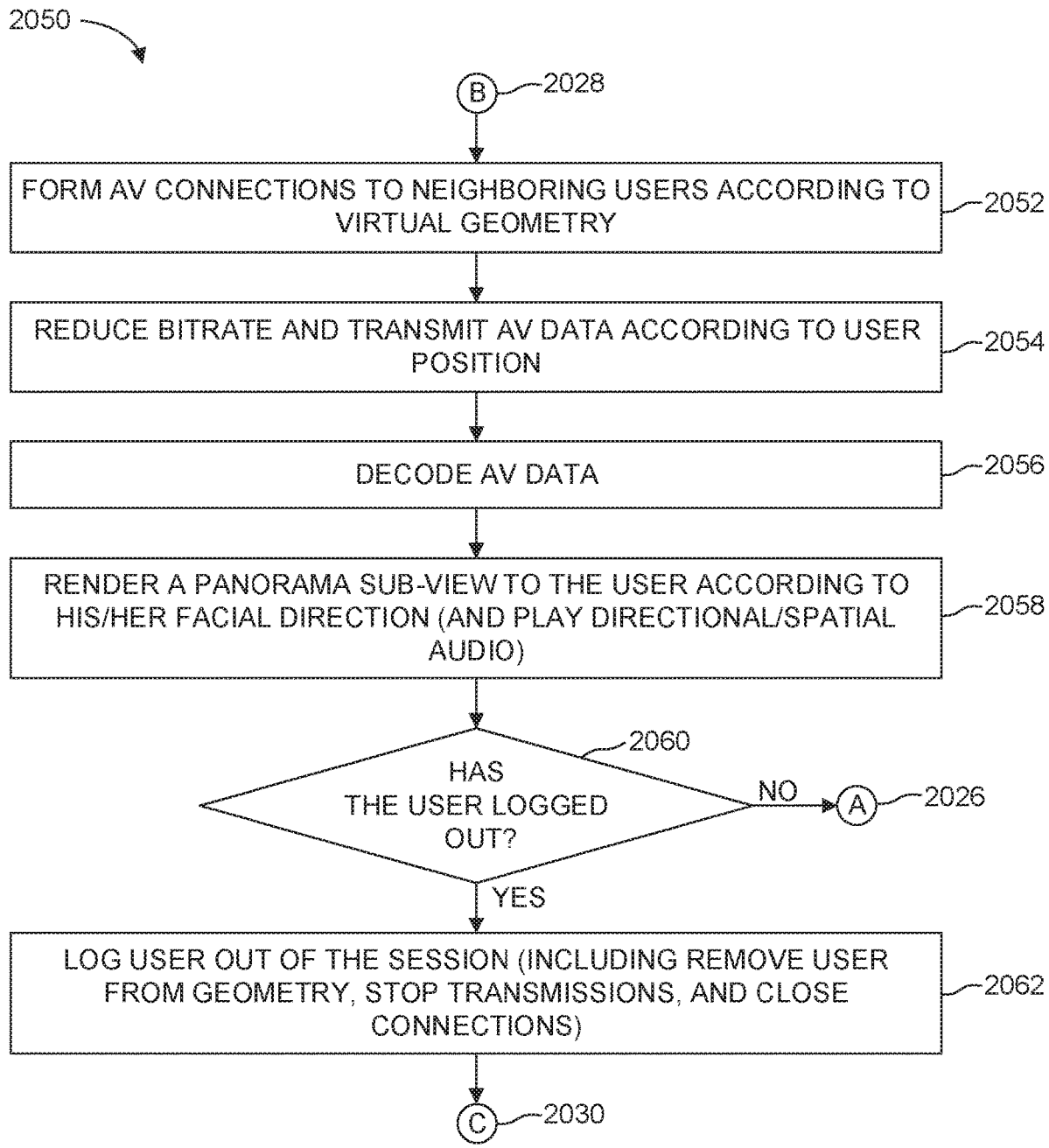

FIGS. 19A and 19B are a set of flowcharts illustrating an example process 200 for a user interfacing with a virtual tessellated space for exploring a unified configuration according to some embodiments. A new participant may start 2002 exploration and may log 2004 into a session. Inputs for user actions may be read 2006 or manually entered. A user position in a local space may be derived and updated 2008. A user position update may be determined to be an incremental position change for some embodiments and may be determined to be an absolute position for another embodiment. For some embodiments, an updated position of a user may be communicated to a server as an incremental position, while another embodiment may communicate to a server an updated position of a user as an absolute position.

A local user's facing direction may be derived and updated 2010 (e.g., by AR/VR glasses). A 3D capture of a user space may be performed 2012. A user space may be reconstructed 2014, and an origin of a user space may be derived (or entered by a local user). A local user may select 2016 a position in a virtual landscape to be designated as his or her domicile. A user also may search a map of the virtual landscape to find occupied and vacant positions. A unified virtual geometry may be formed and updated 2018 by aligning a user space into a grid point (including rotation). A local users position may be mapped 2020 into a unified virtual geometry (which may include updating the unified virtual geometry). A virtual landscape (terrain or view of scene) may be completed 2022 using external components if chosen. A 360° panorama of a landscape from a local users eye-point may be formed 2024 (including removing walls and optionally, obstructing objects from 3D capture result, before forming 2D video). FIG. 19A's flowchart 2000 is connected with FIG. 19B's flowchart 2050 using connector B 2028. Audio/video (AV) connections to neighboring (or remote) users may be formed 2052 according to virtual geometry. Bitrates may be reduced, and AV data may be transmitted 2054 according to a local user's position. AV data may be decoded 2056. A panorama sub-view to the local user may be rendered 2058 according to his or her facial direction, and directional/spatial audio may be played. If a decision process 2060 determines that the local user has not logged out, some embodiments return to read 2006 inputs for local user actions as shown by flowchart connector A (2026). Otherwise, the local user may be logged out 2062 of the session (including removing the user from the geometry, stopping transmissions, and closing connections), and some embodiments may return via connector C (2030) to log 2004 a new local or remote user (or participant) into a session.

Extending Mobility Outside Co-Centric Geometries (in Conferencing)

Some embodiments are symmetric, where user positions are set and tracked in a unified space and coordinates formed by combining separate camera and/or 3D sensor captured spaces, where views to and from users are captured based on their tracked positions, and where users stay within a captured space.

Extending User Mobility in Grid-Based Geometries (in Exploration)

Another embodiment is asymmetric and supports user mobility outside captured spaces. Such a variation may extend mobility outside co-centric geometries for conferencing and may extend user mobility in a grid-based geometry for exploration. If a user exits his or her local space, he or she may still be positioned and tracked with respect to that space, and a system may continue providing, from other spaces and users, audio and spatially faithful views. A user moving outside may continue conferencing by audio with other collaborating participants. This external space may be another room, for example, provided that the user is continued to be tracked. A user may be tracked by GPS in a yard or outside a home, for example. If a user participating in a teleconference is not visually captured, still images (e.g., earlier captured perspectives) or some symbol(s) (for example avatars) may be shown to the other participants, together with audio (optionally, spatial audio depending on a user's distance and direction). A user may explore a virtual landscape/geometry, in which his or her space is part, by physically moving outside his or her local captured space.

Benefits for a asymmetric embodiment include support for a user's spatial awareness and continuation of conferencing with audio. Other benefits for enabling a user to explore an environment's surroundings include enabling a user to know the virtual surroundings and virtual neighbors, to have a closer, asymmetric view of neighboring 3D islands, and to receive teasers, advertisements, and other information available in a user's surroundings. A user may use such knowledge gained from exploration, for example to change the location of his or her own 3D island in a grid-based geometry or landscape.

Combining Co-Centric and Grid-Based Geometries (Conferencing Islands)

For some embodiments, a unified virtual geometry contains captured sub-spaces both with co-centric and grid-based alignment. Such an embodiment may be called conferencing islands. Such an embodiment may support an inside grid-based geometry with semi-permanent group collaboration setups (more permanent than temporal session-based setups). These conferencing islands may have permanent or semi-permanent rights to visit other spaces/rooms. Such an embodiment may be compared to people being residents in the same apartment (more than just people having a telepresence session). Conferencing islands may be favored by close friends or family members. Such an embodiment may be a way of extending and enriching social interaction. Formation and management of corresponding multi-purpose geometries may use methods described earlier for co-centric and grid-based geometries.

Some systems may enable users to see another users eyes by using see-through AR glasses. If using more obstructing (which may be non-transparent) AR glasses, the image of AR glasses may be replaced with an image of a user's eyes. Visibility of a user's eyes may be provided also by other technical means.

Example Networks for Implementation of the Embodiments

A wireless transmit/receive unit (WTRU) may be used as a user device (such as AR/VR goggles) of a conference manger in some embodiments described herein.

FIG. 20 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 20, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in some embodiments, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 20 may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In some embodiments, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 20, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 20, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 20 may be configured to communicate with the base station 114a, which may employ a cellular-based radio technology, and with the base station 114b, which may employ an IEEE 802 radio technology.

Figure 21:
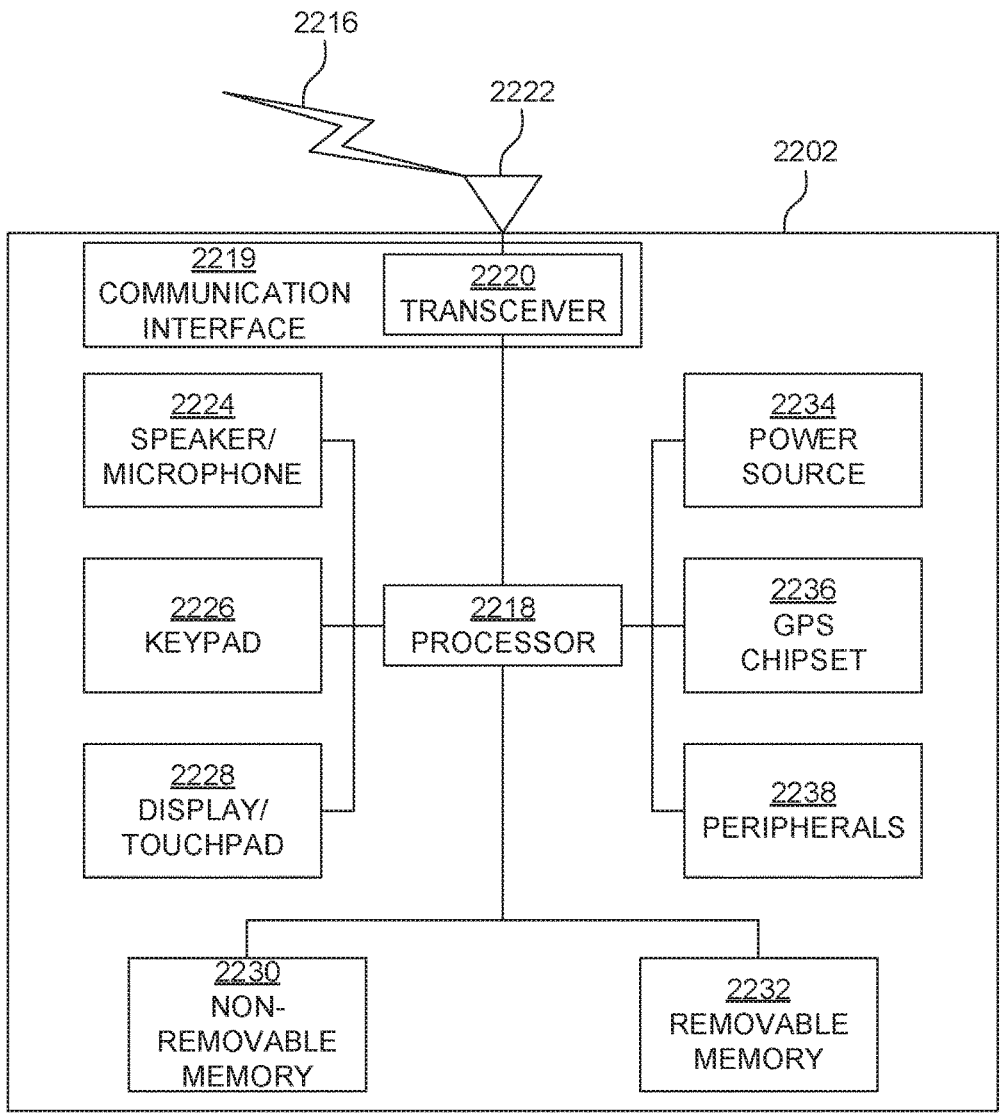
FIG. 21 depicts an example wireless transmit/receive unit (WTRU) that may be used within a communications system according to some embodiments.

FIG. 21 is a system diagram of an example WTRU 2202. As shown in FIG. 21, the WTRU 2202 may include a processor 2218, a transceiver 2220, a transmit/receive element 2222, a speaker/microphone 2224, a keypad 2226, a display/touchpad 2228, a non-removable memory 2230, a removable memory 2232, a power source 2234, a global positioning system (GPS) chipset 2236, and other peripherals 2238. The transceiver 2220 may be implemented as a component of decoder logic 2219. For example, the transceiver 2220 and decoder logic 2219 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

The processor 2218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2218 may perform signal coding, data processing, power control, input/output processing, and/or any other functionality that enables the WTRU 2202 to operate in a wireless environment. The processor 2218 may be coupled to the transceiver 2220, which may be coupled to the transmit/receive element 2222. While FIG. 21 depicts the processor 2218 and the transceiver 2220 as separate components, the processor 2218 and the transceiver 2220 may be integrated together in an electronic package or chip.

The transmit/receive element 2222 may be configured to transmit signals to, or receive signals from, a base station (or other WTRU 2202 for some embodiments) over the air interface 2216. For example, in some embodiments, the transmit/receive element 2222 may be an antenna configured to transmit and/or receive RF signals. In another embodiment, the transmit/receive element 2222 may be an emitter/detector configured to transmit and/or receive IR, UV, or visible light signals, as examples. In yet another embodiment, the transmit/receive element 2222 may be configured to transmit and receive both RF and light signals. The transmit/receive element 2222 may be configured to transmit and/or receive any combination of wireless signals.

In addition, although the transmit/receive element 2222 is depicted in FIG. 21 as a single element, the WTRU 2202 may include any number of transmit/receive elements 2222. More specifically, the WTRU 2202 may employ MIMO technology. Thus, in some embodiments, the WTRU 2202 may include two or more transmit/receive elements 2222 (e.g., multiple antennas) for transmitting and receiving wireless signals over the air interface 2216.

The transceiver 2220 may be configured to modulate the signals that are to be transmitted by the transmit/receive element 2222 and to demodulate the signals that are received by the transmit/receive element 2222. As noted above, the WTRU 2202 may have multi-mode capabilities. Thus, the transceiver 2220 may include multiple transceivers for enabling the WTRU 2202 to communicate via multiple RATs, such as UTRA and IEEE 802.11, as examples.

The processor 2218 of the WTRU 2202 may be coupled to, and may receive user input data from, the speaker/microphone 2224, the keypad 2226, and/or the display/touchpad 2228 (e.g., a liquid crystal display (LCD) display unit or organic light-emitting diode (OLED) display unit). The processor 2218 may also output user data to the speaker/microphone 2224, the keypad 2226, and/or the display/touchpad 2228. In addition, the processor 2218 may access information from, and store data in, any type of suitable memory, such as the non-removable memory 2230 and/or the removable memory 2232. The non-removable memory 2230 may include random-access memory (RAM), read-only memory (ROM), a hard disk, or any other type of memory storage device. The removable memory 2232 may include a subscriber identity module (SIM) card, a memory stick, a secure digital (SD) memory card, and the like. In other embodiments, the processor 2218 may access information from, and store data in, memory that is not physically located on the WTRU 2202, such as on a server or a home computer (not shown).

The processor 2218 may receive power from the power source 2234, and may be configured to distribute and/or control the power to the other components in the WTRU 2202. The power source 2234 may be any suitable device for powering the WTRU 2202. As examples, the power source 2234 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 2218 may also be coupled to the GPS chipset 2236, which may be configured to provide location information (e.g., longitude and latitude) regarding the current location of the WTRU 2202. In addition to, or in lieu of, the information from the GPS chipset 2236, the WTRU 2202 may receive location information over the air interface 2216 from a base station and/or determine its location based on the timing of the signals being received from two or more nearby base stations. The WTRU 2202 may acquire location information by way of any suitable location-determination method while remaining consistent with an embodiment.

The processor 2218 may further be coupled to other peripherals 2238, which may include one or more software and/or hardware modules that provide additional features, functionality and/or wired or wireless connectivity. For example, the peripherals 2238 may include an accelerometer, an e-compass, a satellite transceiver, a digital camera (for photographs or video), a universal serial bus (USB) port, a vibration device, a television transceiver, a hands-free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 2202 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 2218). In an embodiment, the WRTU 2202 may include a half-duplex radio for which transmission and reception of some or all of the signals (e.g., associated with particular subframes for either the UL (e.g., for transmission) or the downlink (e.g., for reception)).

Figure 22:
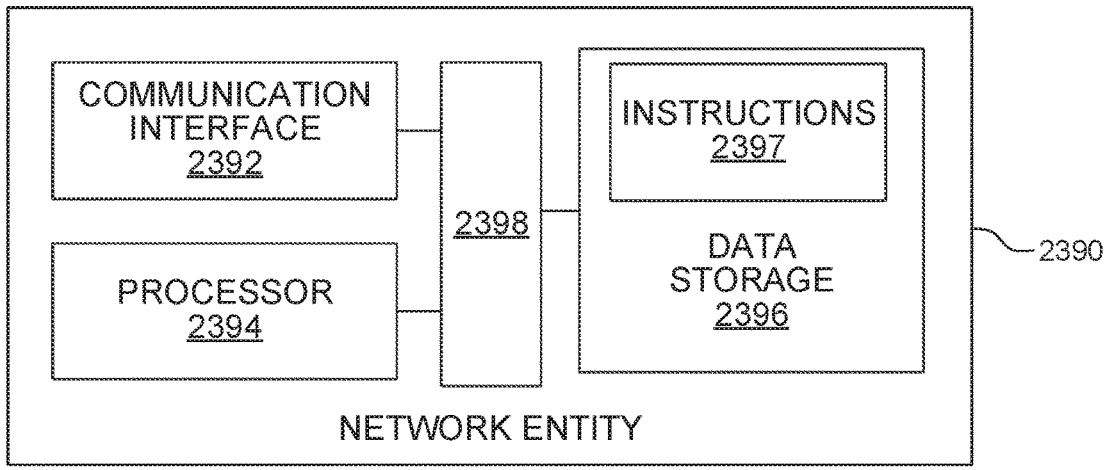
FIG. 22 depicts an exemplary network entity that may be used within a communication system according to some embodiments.

FIG. 22 depicts an example network entity 2390 that may be used within a communication system. As depicted in FIG. 22, network entity 2390 includes a communication interface 2392, a processor 2394, and non-transitory data storage 2396, all of which are communicatively linked by a bus, network, or other communication path 2398.

Communication interface 2392 may include one or more wired communication interfaces and/or one or more wireless-communication interfaces. With respect to wired communication, communication interface 2392 may include one or more interfaces such as Ethernet interfaces, as an example. With respect to wireless communication, communication interface 2392 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 2392 may be equipped at a scale and with a configuration appropriate for acting on the network side—as opposed to the client side—of wireless communications (e.g., LTE communications, Wi-Fi communications, and the like). Thus, communication interface 2392 may include the appropriate equipment and circuitry (perhaps including multiple transceivers) for serving multiple mobile stations, UEs, or other access terminals in a coverage area.

Processor 2394 may include one or more processors of any type deemed suitable by those of skill in the relevant art, some examples including a general-purpose microprocessor and a dedicated DSP.

Data storage 2396 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 22, data storage 2396 contains program instructions 2397 executable by processor 2394 for carrying out various combinations of the various network-entity functions described herein.

In some embodiments, the network-entity functions described herein are carried out by a network entity having a structure similar to that of network entity 2390 of FIG. 22. In some embodiments, one or more of such functions are carried out by a set of multiple network entities in combination, where each network entity has a structure similar to that of network entity 2390 of FIG. 22. And certainly other network entities and/or combinations of network entities may be used in various embodiments for carrying out the network-entity functions described herein, as the foregoing list is provided by way of example and not by way of limitation.

In view of FIGS. 20-22, and the corresponding description of FIGS. 20-22, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Some embodiments of a method may include: for each of a plurality of users, receiving a three-dimensional (3D) local environment scan of the local environment of the respective user; mapping each of the plurality of local environment scans to a respective location and orientation in a shared virtual geometry; responsive to receiving an environment-movement input from a controlling user, modifying at least one of the location and the orientation of the local environment scan of the controlling user with respect to the shared virtual geometry; tracking a perspective location of at least one viewing user in the shared virtual geometry; and generating a two-dimensional (2D) perspective video of the shared virtual geometry from the perspective location of the viewing user.

For some embodiments, mapping the shared virtual geometry may include: aligning each of the plurality of local environment scans to a common origin; and orienting each of the plurality of local environment scans to a common direction, wherein the shared virtual geometry may overlap each of the plurality of local environment scans.

For some embodiments, mapping the shared virtual geometry may include: aligning each of the plurality of local environment scans to a separate point in a grid; and orienting each of the plurality of local environment scans to a common direction, wherein each of the plurality of local environment scans may be assigned to a point in the grid.

For some embodiments, tracking the perspective location (location and direction in shared virtual geometry for generating perspective views) of at least one viewing user in the shared virtual geometry may include: modifying the location for each of the plurality of users in the shared virtual geometry based on movement of each of the plurality of users; modifying the shared virtual geometry based on a plurality of user commands (which may include manual inputs, voice commands, gestures, postures, and body motions and may be assisted by a map of the shared virtual geometry and user positions); and tracking the location and the orientation of at least one viewing user in the modified shared virtual geometry.

For some embodiments, generating the two-dimensional (2D) perspective video of the shared virtual geometry from the perspective location of the viewing user may include: determining a distance in the shared virtual geometry between a first user selected from the plurality of users and a second user selected from the plurality of users; and responsive to determining that the distance between the first and second users in the shared virtual geometry is less than a threshold: selecting a resolution for a representation of the 2D perspective video; and creating the 2D perspective video based on the resolution selected.

For some embodiments, a method may further include computing a combined video combining a background image with the 2D perspective video of the shared virtual geometry from the perspective location of the viewing user.

For some embodiments, a method may further include transmitting the combined video to a first user selected from the plurality of users.

For some embodiments, a method may further include: receiving an audio signal from a first user corresponding to a location and listening direction of a first user, following a change in a location and listening direction of a second user; computing an audio signal corresponding to the location and listening direction of the second user; and transmitting the computed audio signal to the second user.

For some embodiments, a method may further include: receiving a 2D perspective video from another user; decoding the 2D perspective video received from another user to generate a decoded 2D perspective video; augmenting the decoded 2D perspective video with additional content to generate an augmented, 2D perspective video; encoding the augmented, 2D perspective video to generate an encoded 2D perspective video; and transmitting the encoded 2D perspective video to a server.

For some embodiments, a method may further include: transmitting to each of the plurality of users the position of at least one of a plurality of other users within the shared virtual geometry; receiving, from a first user, a two-dimensional (2D) video corresponding to a location, a viewing direction, and a position change of a second user in a spatially faithful way; and transmitting, to the second user, the 2D video received from the first user and a background.

For some embodiments, a method may further include: computing a combined 2D perspective video that combines a background with one of the 2D perspective videos; and displaying the combined 2D perspective video.

For some embodiments, a method may further include: receiving information from a remote user selected from one of the plurality of users for changing a location of a local environment geometry within the shared virtual geometry; selecting a new background for a background associated with the location indicated by the information received from the remote user; and replacing the background of the combined 2D perspective video with the new background.

For some embodiments, a method may further include: detecting an object obstructing a view of a first user selected from the plurality of users from a perspective location of a second user selected from the plurality of users; removing the object from the shared virtual geometry; and generating an updated 2D perspective video without the object of the shared virtual geometry from the perspective location of the second user.

For some embodiments, a method may further include: receiving one of the 2D perspective videos; and displaying the 2D perspective video received.

Some embodiments of an apparatus may include: a processor; and a non-transitory computer-readable medium storing instructions that are operative, when executed on the processor, to perform a method listed above.

Some embodiments of a method may include: providing spatially faithful video conferencing for plurality of users; receiving 3D scans of the local environment of each participant; computing a shared virtual geometry; and managing the location of users within the shared geometry.

For some embodiment, managing the location of users within the shared geometry may include: assigning an initial position in the virtual geometry; modifying the position in the virtual geometry based on individual movement; modifying the geometry based on commands from a user; tracking the position and orientation of conference participants;

receiving perspective 2D video from a first participant corresponding to the location; receiving viewing direction of a second participant and following possible position changes of the second participant in spatially faithful way; computing a panoramic image combining a single 360 background with perspective video for the second participant; transmitting the panoramic image to the second participant; and constructing a shared virtual geometry, wherein the shared virtual geometry may overlap the local geometries of each participant, and the shared virtual geometry may assign individual local geometries to a position in a grid, and wherein constructing a shared virtual geometry may align local geometries is based on common origin and may provide orientation of local geometries to a common direction.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
for each of a plurality of users, receiving a three-dimensional (3D) local environment scan of the local environment of the respective user;
mapping each of the plurality of local environment scans to a respective location and orientation in a shared virtual geometry;
responsive to receiving an environment-movement input from a controlling user, adjusting a mapping from the local environment scan of the controlling user to the shared virtual geometry so as to modify at least one of the location and the orientation of the local environment scan of the controlling user with respect to the shared virtual geometry;
tracking a perspective location of at least one viewing user in the shared virtual geometry; and
generating a perspective video of the shared virtual geometry from the perspective location of the viewing user.

2. The method of claim 1,
wherein mapping the shared virtual geometry comprises:
aligning each of the plurality of local environment scans to a common origin; and
orienting each of the plurality of local environment scans to a common direction, and
wherein the shared virtual geometry overlaps each of the plurality of local environment scans.

3. The method of claim 1,
wherein mapping the shared virtual geometry comprises mapping the local environment scans to different respective cells in a tessellated space.

4. The method of claim 1, wherein tracking the perspective location of at least one viewing user in the shared virtual geometry comprises:
modifying the location for each of the plurality of users in the shared virtual geometry based on movement of each of the plurality of users;
modifying the shared virtual geometry based on a plurality of user commands; and
tracking the location and the orientation of at least one viewing user in the modified shared virtual geometry.

5. The method of claim 1, wherein generating the perspective video of the shared virtual geometry from the perspective location of the viewing user comprises:
determining a distance in the shared virtual geometry between a first user selected from the plurality of users and a second user selected from the plurality of users; and
responsive to determining that the distance between the first and second users is less than a threshold:
selecting a resolution for a representation of the perspective video; and
creating the perspective video based on the resolution selected.

6. The method of claim 1, further comprising computing a combined video combining a background image with the perspective video of the shared virtual geometry from the perspective location of the viewing user.

7. The method of claim 6, further comprising transmitting the combined video to a first user selected from the plurality of users.

8. The method of claim 1, further comprising:
receiving an audio signal from a first user corresponding to a location and listening direction of a first user, following a change in a location and listening direction of a second user;
computing an audio signal corresponding to the location and listening direction of the second user; and
transmitting the computed audio signal to the second user.

9. The method of claim 1, further comprising:
receiving a perspective video from another user;
decoding the perspective video received from another user to generate a decoded perspective video;
augmenting the decoded perspective video with additional content to generate an augmented, 2D perspective video;
encoding the augmented, perspective video to generate an encoded perspective video; and
transmitting the encoded perspective video to a server.

10. The method of claim 1, further comprising:
transmitting to each of the plurality of users the position of at least one of a plurality of other users within the shared virtual geometry;
receiving, from a first user, a video corresponding to a location, a viewing direction, and a position change of a second user in a spatially faithful way; and
transmitting, to the second user, the video received from the first user and a background.

11. The method of claim 1, further comprising:
computing a combined perspective video that combines a background with at least one of the 2D perspective videos; and
displaying the combined perspective video.

12. The method of claim 11, further comprising:
receiving information from a remote user selected from one of the plurality of users for changing a location of a local environment geometry within the shared virtual geometry;
selecting a new background for a background associated with the location indicated by the information received from the remote user; and
replacing the background of the combined perspective video with the new background.

13. The method of claim 1, further comprising:
detecting an object obstructing a view of a first user selected from the plurality of users from a perspective location of a second user selected from the plurality of users;
removing the object from the shared virtual geometry; and
generating an updated perspective video without the object of the shared virtual geometry from the perspective location of the second user.

14. The method of claim 1, further comprising:
receiving at least one of the perspective videos; and
displaying the at least one perspective video received.

15. An apparatus comprising:
a processor; and
a non-transitory computer-readable medium storing instructions that are operative, when executed on the processor, to perform a method comprising:
for each of a plurality of users, receiving a three-dimensional (3D) local environment scan of the local environment of the respective user;
mapping each of the plurality of local environment scans to a respective location and orientation in a shared virtual geometry;
responsive to receiving an environment-movement input from a controlling user, adjusting a mapping from the local environment scan of the controlling user to the shared virtual geometry so as to modify at least one of the location and the orientation of the local environment scan of the controlling user with respect to the shared virtual geometry;
tracking a perspective location of at least one viewing user in the shared virtual geometry; and
generating a perspective video of the shared virtual geometry from the perspective location of the viewing user.

16. The apparatus of claim 15, wherein the mapping is performed to avoid overlapping of the local environment scans in the shared virtual geometry.

17. The apparatus of claim 15, wherein the perspective video comprises at least one two-dimensional (2D) perspective video.

18. The method of claim 1, wherein the mapping is performed to avoid overlapping of the local environment scans in the shared virtual geometry.

19. The method of claim 1, wherein the perspective video comprises at least one two-dimensional (2D) perspective video.

20. The method of claim 1, wherein the adjusting of the mapping is performed so as to modify the location of the local environment scan of the controlling user with respect to the shared virtual geometry.

* * * * *